United States Patent
Lu et al.

(10) Patent No.: US 11,271,932 B2
(45) Date of Patent: Mar. 8, 2022

(54) METHOD FOR INTEGRATING AUTHENTICATION DEVICE AND WEBSITE, SYSTEM AND APPARATUS

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 315 days.

(21) Appl. No.: 16/470,591

(22) PCT Filed: Jan. 31, 2018

(86) PCT No.: PCT/CN2018/074736
§ 371 (c)(1),
(2) Date: Jun. 18, 2019

(87) PCT Pub. No.: WO2018/145593
PCT Pub. Date: Aug. 16, 2018

(65) Prior Publication Data
US 2019/0386993 A1 Dec. 19, 2019

(30) Foreign Application Priority Data

Feb. 8, 2017 (CN) .......................... 201710068729.6

(51) Int. Cl.
*H04L 29/06* (2006.01)
*H04L 9/32* (2006.01)
*H04L 67/303* (2022.01)

(52) U.S. Cl.
CPC ........ *H04L 63/0884* (2013.01); *H04L 9/3263* (2013.01); *H04L 67/303* (2013.01)

(58) Field of Classification Search
CPC . H04L 63/0884; H04L 65/1073; H04L 67/02; H04L 9/32; H04L 63/08;
(Continued)

(56) References Cited

U.S. PATENT DOCUMENTS 9,654,469 B1 * 5/2017 Yang .................. G06K 9/00288
10,270,748 B2 * 4/2019 Briceno ................ H04L 63/205
(Continued)

FOREIGN PATENT DOCUMENTS

WO WO2017041621 * 3/2017 ........... H04L 63/062

*Primary Examiner* — Lizbeth Torres-Diaz
(74) *Attorney, Agent, or Firm* — Hammer & Associates, P.C.

(57) ABSTRACT

A method for integrating an authentication device and a website, the method comprising: a registration plug-in receiving user registration information from a website and a registration result identifier corresponding to the user registration information, and determining whether the user has registered successfully according to the registration result identifier; if yes, then sending registered information to the website and ending the registration process; otherwise, sending a request to obtain device registration, which comprises a user identifier, to an authentication server; receiving the device registration request from the authentication server; sending the device registration request to an authentication device by means of a browser; receiving device registration data, which is generated by the authentication device, by means of the browser; sending a first authentication request comprising the device registration data to the authentication server; receiving a first authentication result from the authentication server; sending the first authentication result to the website, for use in the website verifying whether the user is registered successfully. According to the present invention, the authentication device is integrated with a (Continued)

website that applies Joomla technology so as to register and authenticate a user on the website.

18 Claims, 8 Drawing Sheets

(58) Field of Classification Search
CPC ... H04L 63/20; H04L 63/0823; H04L 63/102; H04L 67/303; H04L 67/306; G06F 21/31; G06F 2221/2117; G06F 9/44526
See application file for complete search history.

(56) References Cited

U.S. PATENT DOCUMENTS

| | | | | |
|---|---|---|---|---|
| 2003/0233361 | A1* | 12/2003 | Cady | H04L 67/14 |
| 2006/0259767 | A1* | 11/2006 | Mansz | G06F 21/51 |
| | | | | 713/168 |
| 2007/0211892 | A1 | 9/2007 | Ohkoshi | |
| 2010/0274634 | A1* | 10/2010 | Ifrah | H04L 9/3231 |
| | | | | 705/7.11 |
| 2011/0083018 | A1* | 4/2011 | Kesanupalli | G06Q 20/40 |
| | | | | 713/186 |
| 2011/0219429 | A1* | 9/2011 | Lee | H04W 12/06 |
| | | | | 726/3 |
| 2012/0284195 | A1* | 11/2012 | McMillen | H04W 12/068 |
| | | | | 705/71 |
| 2014/0122343 | A1* | 5/2014 | Einav | G06F 21/554 |
| | | | | 705/67 |
| 2014/0136704 | A1* | 5/2014 | Yang | G06F 21/6245 |
| | | | | 709/225 |
| 2014/0289833 | A1* | 9/2014 | Briceno | H04W 12/06 |
| | | | | 726/7 |
| 2015/0106882 | A1* | 4/2015 | Li | H04L 63/0823 |
| | | | | 726/4 |
| 2015/0288676 | A1* | 10/2015 | Guo | G06F 21/45 |
| | | | | 726/7 |
| 2016/0014162 | A1* | 1/2016 | Baghdasaryan | H04L 63/20 |
| | | | | 726/1 |
| 2017/0048218 | A1* | 2/2017 | Lindemann | G06Q 20/40145 |
| 2017/0109751 | A1* | 4/2017 | Dunkelberger | H04L 9/3231 |
| 2017/0142130 | A1* | 5/2017 | Lin | H04L 67/1097 |
| 2017/0250982 | A1* | 8/2017 | Yang | H04L 67/02 |
| 2017/0272420 | A1* | 9/2017 | Yang | G06F 9/45533 |
| 2017/0339563 | A1* | 11/2017 | Singleton, IV | H04L 63/083 |
| 2018/0359103 | A1* | 12/2018 | Geupel | H04L 9/3268 |
| 2019/0068597 | A1* | 2/2019 | Shah | H04L 63/0884 |
| 2019/0222424 | A1* | 7/2019 | Lindemann | H04L 63/0861 |
| 2019/0253404 | A1* | 8/2019 | Briceno | G06F 21/31 |
| 2019/0386993 | A1* | 12/2019 | Lu | H04L 9/3263 |

* cited by examiner

METHOD FOR INTEGRATING AUTHENTICATION DEVICE AND WEBSITE, SYSTEM AND APPARATUS

FIELD OF THE INVENTION

The present invention is related to a method for integrating an authentication device and a website, a system and an apparatus thereof, belongs to computer technology field.

BACKGROUND OF THE INVENTION

Joomla is one of the popular open source Content Management System (CMS), which can operate on various platforms such as Linux, Windows and MacOSX, etc. In the prior art, Joomla is widely used in building various websites and applications developed on the basis of Web. However, how to integrate the authentication device with a website using Joomla technology to implement logon and authentication of a user on the website still to be a technical problem needed be solved.

SUMMARY OF THE INVENTION

The object of the present invention is to provide a method for integrating an authentication device and a website, a system and an apparatus, which integrates the authentication device with the website using Joomla technology to implement logon and authentication of a user on the website.

According to one aspect of the present invention, there is provided a method for integrating an authentication device and a website, which includes an authentication device, a browser, a website, a registration plugin and an authentication server, the method includes a registering process, which includes:

Step s1, receiving, by the website, user registration information via the browser, sending the user registration information and a registration result identification corresponding to the user registration information to the registration plugin;

Step s2, determining, by the registration plugin, whether the user has registered successfully according to the registration result identification, sending information that the user has been registered successfully in the case that the registration plugin determines that the user has registered successfully and the website executes Step s10; otherwise, sending, by the authentication server, an obtaining device registering request including the identification of the user registration information to the authentication server;

Step s3, sending, by the authentication server, a device registering request including a first challenge value and application parameters to the registration plugin;

Step s4, sending, by the registration plugin, the device registering request to the authentication device via the browser, prompting the user to press down a button of the authentication device at a page of waiting for registering via the browser;

Step s5, waiting, by the authentication device, for the user to press the button, generating a key handle according to the first challenge value and the application parameters, which are in the device registering request, a first public key and a first private key which are corresponding to the key handle, using a preset hardware private key to sign the first public key and the key handle to generate a first signing value, sending device registration data including the key handle, the first public key, the first signing value and a hardware certificate to the registration plugin;

Step s6, sending, by the registration plugin, a first authentication request including the device registration data to the authentication server;

Step s7, obtaining, by the authentication server, a hardware public key from the hardware certificate, using the hardware public key to verify the first signing value to obtain a first authentication result, building corresponding relation among the key handle, the first public key and the user identification in the case that the first authentication result is success, sending the first authentication result to the registration plugin, the registration plugin executes Step s8; sending the first authentication result to the registration plugin in the case that the first authentication result is failed, the registration plugin execute Step s8;

Step s8, sending, by the registration plugin, to the first authentication result to the website;

Step s9, determining, by the website, whether the user registered successfully according to the first authentication result, displaying information that the user registered successfully via the browser, ending register flow; otherwise, displaying information that the user registered unsuccessfully via the browser, ending register flow; and Step s10, displaying, by the website, information that the user has registered via the browser, ending registering process.

According to another aspect of the present invention, there is provided a method for integrating an authentication device and a website, which includes registering process; the registering process includes:

Step t1, receiving, by a registration plugin, user registration information and a registration result identification corresponding to user registration information from the website;

Step t2, determining, by the registration plugin, whether the user is registered successfully according to the registration result identification, if yes, send information that the user has been registered to the website and end the registering process; otherwise, send an obtaining device registering request, which comprises the user identification in the user registration information, to an authentication server, execute Step t3;

Step t3, receiving, by the registration plugin, a device registering request from the authentication server;

Step t4, sending, by the registration plugin, a device registering request to an authentication device via a browser, waiting for the authentication device to generate device registration data;

Step t5, receiving, by the registration plugin, the device registration data generated by the authentication device via the browser;

Step t6, sending, by the registration plugin, a first authentication request including the device registration data to the authentication server;

Step t7, receiving, by the registration plugin, a first authentication result from the authentication server; and Step t8, sending, by the registration plugin, the first authentication result, which is for the website to authenticate whether the user registered successfully, to the website.

According to another aspect of the present invention, there is provided an integrating system of an authentication device and a website, which comprises an authentication device, a browser, a website and a registration plugin and an authentication server;

the website comprising: a first receiving module, a first sending module, a tenth receiving module, a second determining module, an eleventh module and a tenth sending module;

the registration plugin comprising: a second receiving module, a first determining module, a second sending module, a third sending module, a fourth receiving module, a fifth sending module, a sixth receiving module, a seventh sending module, a ninth receiving module, and a ninth sending module;

the authentication server comprising: a third receiving module, a fourth sending module, a seventh receiving module, a first verifying module, a first associating module and an eighth sending module;

the authentication device comprising: a fifth receiving module, a first obtaining module, a first generating module and a sixth sending module;

the browser comprising: a twelfth receiving module, an eleventh sending module, the first displaying module, a thirteenth receiving module and a second displaying module;

the first receiving module configured to receive user registration information via the browser;

the first sending module configured to send the user registration information and a register identification corresponding to the user registration information to the registration plugin;

the second receiving module configured to receive the user registration information and the registration result identification corresponding to the user registration information from the website;

the first determining module configured to determine whether the user has registered successfully according to the registration result identification;

the second sending module configured to send information that the user has registered to the website in the case that the determining result of the first determining module is yes;

the third sending module configured to send an obtaining device register request including the user identification in the user registration information to the authentication server in the case that the determining result of the first determining module is no;

the third receiving module configured to receive the obtaining register request including the user identification in the user registration information from the registration plugin;

the fourth sending module configured to send the user register request including the a first challenge value and the application parameters to the registration plugin;

the fourth receiving module configured to receive the device registering request including the first challenge value and the application parameters of authentication server from the authentication server;

the fifth sending module configured to send the device registering request to the browser;

the twelfth receiving module configured to receive the device registering request including the first challenge value and the application parameters of the authentication server from the registration plugin;

the first displaying module configured to prompt the user to press a button of the authentication device via a register waiting page after the twelfth receiving module receives the device registering request;

the eleventh sending module configured to send the device registering request to the authentication device;

the fifth receiving module configured to receive the device registering request from the browser;

the first obtaining module configured to wait for the user to press the button and obtain information that the user has pressed the button in the case that the fifth receiving module receives the device registering request;

the first generating module configured to, generate a key handle and a first public key and a first private key which are corresponding to the key handle, use a preset hardware private key to generate a first signing value after the first obtaining module obtains the information that the user has pressed the button, organize device registration data including the key handle, the first public key, the first signing value and the hardware certificate;

the sixth sending module configured to, send the device registration data, which comprises the key handle, the first public key, the first signing value and the hardware certificate, generated by the first generating module to the registration plugin via the browser;

the sixth receiving module configured to receive the device registration data which comprises the key handle, the first public key, the first signing value and the hardware certificate from the browser;

the seventh receiving module configured to receive the first authentication request including the device registration data from the registration plugin;

the seventh sending module configured to send a first authentication request comprising the device registration data to the authentication server;

the first verifying module configured to obtain a hardware public key from the hardware certificate of the first authentication request received by the seventh receiving module, use the hardware public key to verify the first signing value to obtain a first authentication result;

the first associating module configured to build corresponding relation among the key handle, the first public key and the user identification in the case that the first authentication result is success;

the eighth sending module configured to send the first authentication result after the first associating module builds the corresponding relation among the key handle, the first public key and the user identification; send the first authentication result to the registration plugin in the case that the first authentication result is failure;

the ninth receiving module configured to receive the first authentication result from the authentication server;

the ninth sending module configured to send the first authentication result to the website; the tenth receiving module configured to receive the first authentication result of the registration plugin;

the second determining module configured to determine whether the user registered successfully according to the first authentication result received by the tenth receiving module;

the eleventh receiving module configured to receive registered information from the registration plugin;

the tenth sending module configured to send information of successful registering to the browser in the case that the determining result of the second determining module is yes; send information of failed registering to the browser in the case that the determining result of the second determining module is no; send the registered information to the browser after the eleventh receiving module receives the registered information from the eleventh receiving module;

the thirteenth receiving module configured to receive information of successful registering, information of failed registering or registered information; and the second displaying module configured to display that the user registered successful after the thirteenth receiving module receives the information of successful registering; display that the user registered failed after the thirteenth receiving module receives the information of failed registering; display that the user has registered after the thirteenth receiving module receives the information that the user has registered.

According to another aspect of the present invention, there is provided an integrating apparatus of an authentication device and a website, which comprises a registration plugin;

the registration plugin comprises: a second receiving module, a first determining module, a second sending module, a third sending module, a fourth receiving module, a fifth sending module, a sixth receiving module, a seventh sending module, a ninth receiving module and a ninth sending module;

the second receiving module is configured to receive user registration information and a registration result identification corresponding to user registration information from the website;

the first determining module is configured to determine whether the user is registered successfully according to the registration result identification;

the second sending module is configured to send information that the user has been registered to the website in the case that determining result of the first determining module is yes;

the third sending module is configured to send an obtaining device registering request, which comprises the user identification in the user registration information, to an authentication server in the case that the determining result of the first determining module is no;

the fourth receiving module is configured to receive a device registering request from the authentication server;

the fifth sending module is configured to send a device registering request to an authentication device via a browser;

the sixth receiving module is configured to receive the device registration data generated by the authentication device via the browser;

the seventh sending module is configured to send a first authentication request comprising the device registration data to the authentication server;

the ninth receiving module is configured to receive a first authentication result from the authentication server; and the ninth sending module is configured to send the first authentication result to the website.

According to the present invention, the authentication device is integrated with the website using Joomla technology, which implements registering and authenticating of a user at the website.

DETAILED DESCRIPTION

The technical solutions of the embodiments of the disclosure are described clearly and completely in conjunction with the accompanying drawings as follows. Apparently, the described embodiments are merely a part but not all of the embodiments according to the disclosure. Based on the described embodiments of the disclosure, other embodiments obtained by those skilled in the art without any creative work belong to the scope of the disclosure.

Embodiment 1

Figure 1:
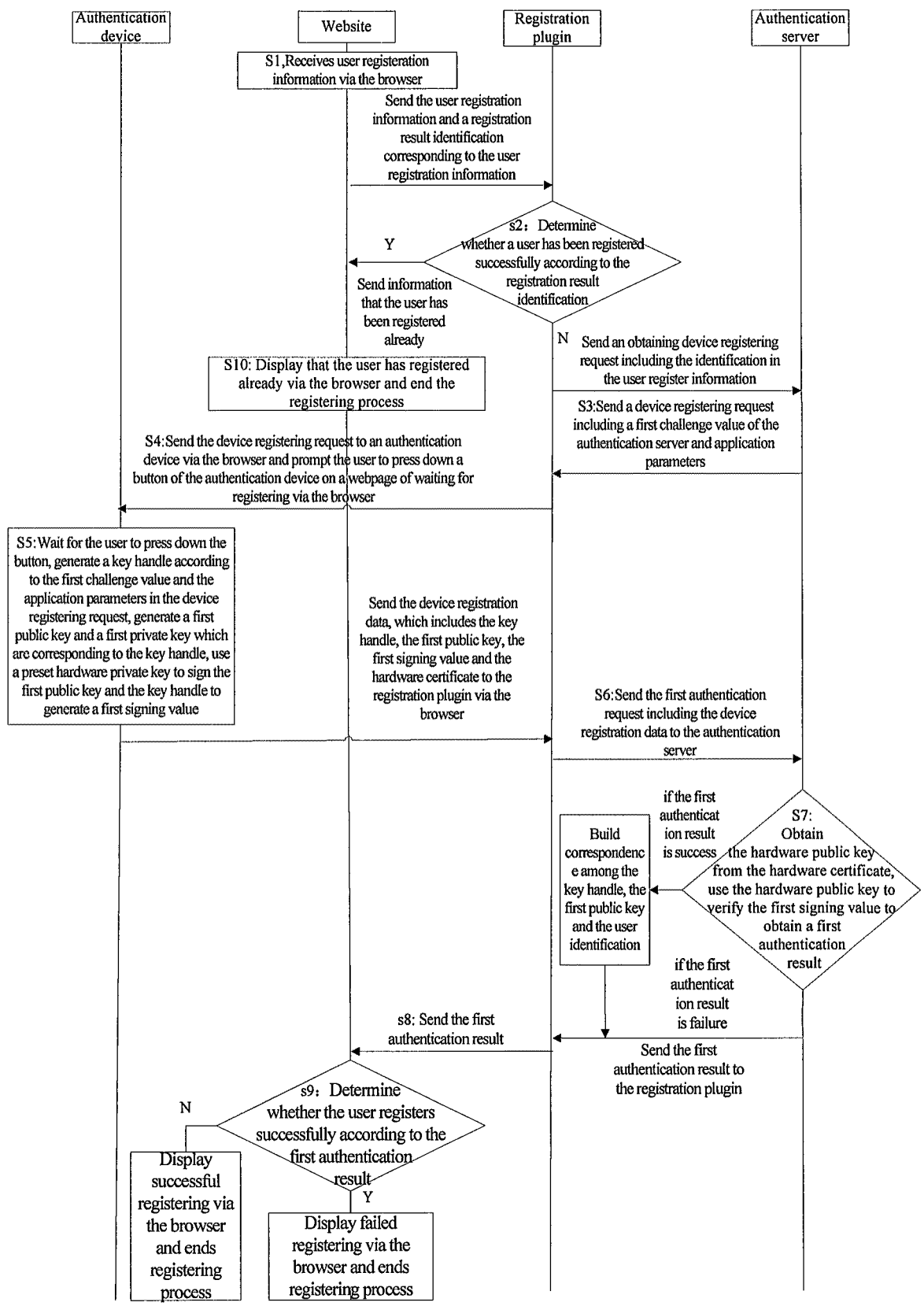
FIG. 1 is a flowchart of a registering process in a method for integrating an authentication device and a website provided in Embodiment 1 of the present invention.

Embodiment 1 provides a method integrating an authentication device and a website, which is adapted to a system including the authentication device, a browser, a website, a registration plugin and an authentication server. As shown in FIG. 1, the method includes a registering process. The registering process includes:

In Embodiment 1, specifically, the website is developed by using Joomla technology.

Step s1, the website receives user registration information via the browser, sends the user registration information and a registering result identification corresponding to the user registration information to the registration plugin;

in this case, that the website sends the user registration information and a registering result identification corresponding to the user registration information to the registration plugin specifically includes that the website invokes a first function of the registration plugin to send the user registration information and the registering result identification corresponding to the user registration information to the registration plugin.

In Embodiment 1, the first function of the registration plugin is specifically on UserAfterSave function.

Step s2, the registration plugin determines whether a user has been registered successfully according to the registration result identification, if yes, the registration plugin sends information that the user has been registered already to the website, and executes Step s10; otherwise, the registration plugin sends an obtaining device registering request including the identification in the user registration information;

Step s3, the authentication server sends a device registering request including a first challenge value of the authentication server and application parameters to the registration plugin;

Step s4, the registration plugin sends the device registering request to an authentication device via the browser and prompts the user to press down a button of the authentication device on a webpage of waiting for registering via the browser;

Specifically, the registration plugin generates a first web address redirecting request including the device registering request and sends the first web address redirecting request including the device registering request to the browser, the browser displays a webpage of waiting for registering according to the first web address redirecting request to the user, prompts the user to press down a button of the authentication device on the webpage of waiting for registering, and sends the device registering request in the first web address redirecting request to the authentication device.

Step s5, the authentication device waits for the user to press down the button, generates a key handle, a first public key and a first private key which are corresponding to the key handle according to the first challenge value and the application parameters in the device registering request, uses a preset hardware private key to sign the first public key and the key handle to generate a first signing value, sends the device registration data, which includes the key handle, the first public key, the first signing value and a hardware certificate to the registration plugin via the browser;

Step s6, the registration plugin sends the first authentication request including the device registration data to the authentication server;

Step s7, the authentication server obtains the hardware public key from the hardware certificate, uses the hardware public key to verify the first signing value to obtain a first authentication result, if the first authentication result is successful, builds correspondence among the key handle, the first public key and the user identification, sends the first authentication result to the registration plugin, the registration plugin executes Step s8; if the first authentication result is failure, sends the first authentication result to the registration plugin and the registration plugin execute Step s8;

Step s8, the registration plugin sends the first authentication result to the website;

Step s9, the website determines whether the user registers successfully according to the first authentication result, if yes, the website displays successfully registering via the browser and ends registering process; otherwise, the website displays failed registering via the browser and ends registering process;

Step s10, the website displays that the user has registered already via the browser and ends the registering process.

In Embodiment 1, Step s4 can be replaced by that the registration plugin sends the device registering request to the authentication device viva the browser and displays a webpage of waiting for registering via the browser; correspondingly, after the authentication device receives the device registering request, before obtaining information that the user has pressed the button, Step s5 further includes that the authentication device prompts the user to press down the button of the authentication device.

Further, that the registration plugin sends the device registering request to the authentication device via the browser and displays the page of waiting for registering via the browser specifically includes that the registration plugin generates a second web address redirecting request including the device registering request and sends the second web address redirecting request including the device registering request to the browser, the browser displaying the web page of waiting for registering to the user according to the second web address redirecting request and sends the device register request in the second web address redirecting request to the authentication device.

In Embodiment 1, that the registration plugin determines whether the user has been registered successfully according to the registration result identification specifically includes that the registration plugin determines whether the registration result identification corresponding to the user registration information is successful identification, if yes, the registration plugin determines that register is successful; otherwise, the registration plugin determines that the register is not successful; if the website determines that the registration of the user is successful, the method further includes setting the registration result identification corresponding to the user registration information to be successful identification.

In Embodiment 1, before the registration plugin sends the obtaining device registering request to the authentication server, the method further includes initializing a channel to the authentication server.

In this case, initializing the channel to the authentication server specifically includes that the registration plugin initializes the channel to the authentication server according to preset application configuration information.

In Embodiment 1, the system further includes an authentication plugin, correspondingly, the method of Embodiment 1 further includes an authentication process, which includes following steps:

Step r1, the browser obtains user logon information and sends the obtaining device authentication request including the user identification in the user logon information to the authentication plugin;

Specifically, sending the obtaining device authentication request including the user identification in the user logon information to the authentication plugin is that the browser invokes a second function in the authentication plugin to send the obtaining device authentication request including the user identification in the user logon information to the authentication plugin.

In Embodiment 1, the second function in the authentication plugin specifically is onAfterRender function.

Step r2, the authentication plugin sends the obtaining device authentication request to the authentication server;

Step r3, the authentication server obtains the key handle corresponding to the user identification and sends the device authentication request including the key handle, its second challenge value and application parameter;

Step r4, the authentication plugin sends the device authentication request to the browser and prompts the user to press a button of the authentication device on the web page of waiting for authentication via the browser;

Specifically, the authentication plugin sends the device authentication request, the browser sends the device authentication request to the authentication device and prompts the user to press down the button of the authentication device on the page of waiting for authentication.

Step r5, the authentication device waits for the user to press the button, obtains the first private key corresponding to the key handle in the device authentication request after obtaining information that the user has pressed the button, uses the first private key to sign the second challenge value and the application parameter to generate a second signing value, generates device authentication data including the second signing value and sends the device authentication data to the browser;

Step r6, the browser sends the device authentication data and the user logon information to the website;

Step r7, the website sends the device authentication data and the user logon information to the authentication plugin;

Specifically, the website invokes a third function of the authentication plugin to send the device authentication data and the user logon information to the authentication plugin.

In Embodiment 1, the third function of the authentication plugin is specifically on UserTwofactorAuthenticate function.

Step r8, the authentication plugin sends the second authentication request including the device authentication data and the user identification in the user logon information to the server;

Step r9, the authentication server obtains the first public key corresponding to the user identification in the second authentication request, uses the first public key to verify the second signing value to obtain the second authentication result and sends the second authentication result to the authentication plugin;

Step r10, the authentication plugin sends the second authentication result to the website;

Step r11, the website determines whether the user logs on successfully according to the second authentication result, if yes, displays that logon is successful and ends authenticating process; otherwise, displays that logon is failed and ends the authenticating process.

In Embodiment 1, Step r4 further can be replaced by that the authentication plugin sends the device authentication request to the authentication device via the browser and displays the webpage of waiting for authentication via the browser; correspondingly, after the authentication device receives the device authentication request before waiting for the user to press the button, Step r5 further includes that the authentication device prompts the user to press down the button of the authentication device.

In Embodiment 1, step r1 specifically includes that, after the browser script in the browser monitors a logon clicking event, the browser script obtains user logon information in the browser webpage, generates the obtaining device authentication request including the user identification of the user logon information, sends the obtaining device authentication request including the user identification in the user logon information to the authentication plugin; correspondingly, Step r6 specifically is that the browser script of the browser sends the device authentication data and the user logon information to the website.

Further, after the authentication device sends the device authentication data to the browser, the method further includes that the browser script assigns the device authentication data to a hidden form item of the browser page;

That the browser script of the browser sends the device authentication data and the user logon information to the website specifically includes that the browser script sends the hidden form item and the user logon information to the website.

In Embodiment 1, before Step r2, the method further includes that the authentication plugin initializes the session channel to the authentication server.

In this case, initializing the session channel to the authentication server specifically includes that the authentication plugin initializes the session channel to the authentication server according to preset application configuration information.

Embodiment 1 provides a method integrating the authentication device and the website, which realizes user registration and user authentication on a website.

Embodiment 2

Figure 2:
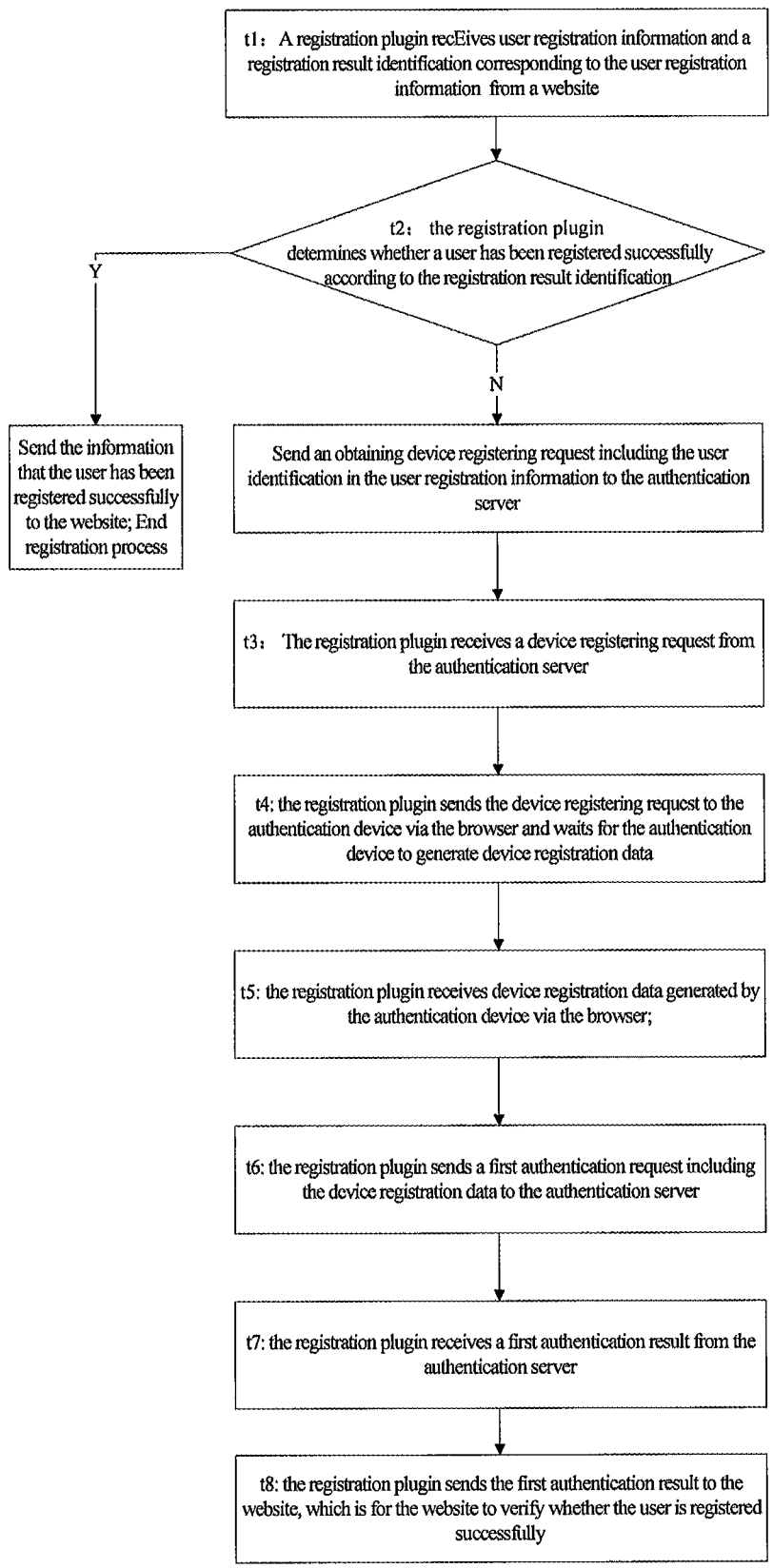
FIG. 2 is a flowchart of a registering process in a method for integrating an authentication device and a website provided in Embodiment 2 of the present invention.

Embodiment 2 provides a method of integrating an authentication device and a website, which includes a registering process. As shown in FIG. 2, the registering process includes the following steps.

In Embodiment 2, the website specifically is a website which is developed by using Joomla technology.

Step t1, a registration plugin receives user registration information and a registration result identification corresponding to the user registration information from a website;

Specifically, Step t1 is that the first function of the registration plugin is invoked and receives the user registration information from the website and the registration result identification corresponding to the user registration information.

In Embodiment 2, the first function of the registration plugin specifically is onUserAfterSave function.

Step t2, the registration plugin determines whether a user has been registered successfully according to the registration result identification, if yes, sends the information that the user has been registered successfully to the website and ends registering process; otherwise, sends an obtaining device registering request including the user identification in the user registration information to the authentication server and executes Step t3;

Step t3, the registration plugin receives a device registering request from the authentication server;

Specifically, the registration plugin receives a device registering request including a first challenge value and an application parameter from the authentication server.

Step t4, the registration plugin sends a device registering request to the authentication device via the browser and waits for the authentication device to generate device registration data;

Step t5, the registration plugin receives device registration data generated by the authentication device via the browser;

Step t6, the registration plugin sends a first authentication request including the device registration data to the authentication server;

Step t7, the registration plugin receives a first authentication result from the authentication server;

Step t8, the registration plugin sends the first authentication result to the website, which is for the website to verify whether the user is registered successfully.

In Embodiment 2, after the registration plugin sends the device registering request to the authentication device via the browser, Step t4 further includes that the registration plugin prompts the user to press down a button of the authentication device on a webpage of waiting for registering via the browser, or after the registration plugin sends the device registering request to the authentication device via the browser, and the registration plugin displays a webpage of waiting for registering via the browser.

If the registration plugin prompts the user to press down the button of the authentication device on the webpage of waiting for registering via the browser, specifically, Step t4 is that the registration plugin generates a first web address redirecting request including the device registering request and sends the first web address redirecting request including the device registering request to the browser, displaying a registering waiting page to the user via the browser, prompts the user to press down the button of the authentication device on the registering waiting page; sends the device registering request included in the first web address registering request to the authentication device via the browser, waits for the authentication device to generate the device registration data.

If the registration plugin displays the registering waiting page via the browser, Step t4 specifically includes that the registration plugin generates a second web address redirecting request including the device registering request, sends the second web address redirecting request including the device registering request to the browser, displaying the registering waiting page to the user, sends the device registering request included in the second web address redirecting request to the authentication device via the browser and waits for the authentication device to generate the device registration data.

If the registration plugin displays the registering waiting page via the browser, that the authentication device generates the device registration data specifically includes that the authentication device prompts the user to press the button of the authentication device, waits for the user to press down the button, generates a key handle according to a first challenge value and application parameters and generates a first public key and a first private key, which are corresponds to the key handle, in the case of obtaining information that the user has pressed the button, uses a preset hardware private key to sign the first public key and the key handle to generate a first signing value, organizes the device registering data including the key handle, the first public key, the first signing value and device registration data of the hardware certificate.

If registration plugin prompts the user to press down the button of the authentication device on the registering waiting page via the browser, that the authentication device generates the device registration data specifically includes that the authentication device waits for the user to press down the button, generates a key handle and the first public key and the first private key which are corresponds to the key handle according to the first challenge value and the application parameters in the device registering request, uses the preset hardware private key to sign the first public key and the key handle to generate the first signing value, organizes the device registration data including the key handle, the first public key, the first signing value and the hardware certificate.

The method provided in Embodiment 2 further includes that the authentication server sends the device registering request including the first challenge value and the application parameters to the registration plugin after the authentication server receives the obtaining device registering request including the user identification in the user registration information from the registration plugin; the authentication server obtains the hardware public key from the hardware certificate after the authentication server receives a first authentication request from the registration plugin, uses the hardware public key to verify the first signing value to obtain a first authentication result, if the first authentication result is success, the authentication server builds corresponding relation among the key handle, the first public key and the user identification, sends the first authentication result to the registration plugin; the authentication server sends the first authentication result to the registration plugin if the first authentication result is failure.

In Embodiment 2, that the website verifies whether the user registered successfully specifically includes that the website determines whether the user registered successfully according to the first authentication result, if yes, displays successfully registering via the browser and ends registering process; otherwise, displays failed registering via the browser and ends registering process.

Further, that the registration plugin determines whether the user has registered successfully according to the registration result identification specifically includes that the registration plugin determines whether the registration result identification corresponding to the user registration information is successful identification, if yes, the registration plugin determines that the user has registered successfully, otherwise the registration plugin determines that the user has registered failed; in the case that the website determines that the user has registered successfully according to the first authentication result, the method further includes that the website sets the registration result identification corresponding to the user registration information to be successful identification.

In Embodiment 2, before the registration plugin sends the obtaining device registering request to the authentication server, the method further includes initializing session channel with the authentication server.

In this case, initializing session channel with the authentication server specifically includes that the registration plugin initializes the session channel with the authentication server according to preset application configuring information.

The method provided in Embodiment 2 further includes an authenticating process. The authenticating process further includes;

Step w1, the authentication plugin receives an obtaining device authentication request including the user identification in the user logon information from the browser;

Step w1 specifically includes that a second function of the authentication plugin is invoked, the authentication plugin receives the obtaining device authentication request including the user identification of the user logon information from the browser.

In Embodiment 2, the second function of the authentication plugin is onAfterRender function.

Step w2, the authentication plugin sends an obtaining device authentication request to the authentication server;

Step w3, the authentication plugin receives the device authentication request from the authentication server;

Specifically, the authentication plugin receives the device authentication request including the key handle, the second challenge value and the application parameters from the authentication server;

Step w4, the authentication plugin sends the device authentication request to the authentication device via the browser and waits for the authentication device to generate the device authentication data;

In Embodiment 2, Step w4 further includes that the authentication plugin prompts the user to press down the button of the authentication device on the authentication waiting page via the browser or the authentication plugin displays the authentication waiting page via the browser.

In the case that the authentication plugin displays the authentication waiting page via the browser, that the authentication device generates the device authentication data specifically includes that the authentication device prompts the user to press down the button of the authentication device and waits for the user to press down the button; after obtaining the information that the user has pressed down the button, the authentication device obtains the first private key corresponding tot eh key handle in the device authentication request, uses the first private key to sign the second challenge value and the application parameters in the device authentication request to generate the second signing value, and generates the device authentication data including the second signing value.

In the case that the authentication plugin prompts the user to press down the button of the authentication device on the authentication waiting page via the browser, that the authentication device generates the device authentication data specifically includes that: the authentication device waits for the user to press down the button; after obtaining that the user pressed the button, the authentication device obtains the first private key corresponding to the key handle in the device authentication request, uses the first private key to sign the second challenge value and the application parameters in the device authentication request to generate the second signing value, and generates the device authentication data including the second signing value.

Furthermore, the method provided in Embodiment 2 further includes that, after the authentication server receives the obtaining device authentication request of the authentication plugin, the authentication server obtains the key handle which corresponds to the user identification of the authentication device and sends the device authentication request including the key handle, the second challenge value and the application parameter;

After the authentication server receives the second authentication request including the user identification of the user logon information and the device authentication data, the authentication server obtains the first public key corresponding to the user identification in the second authentication request, uses the first public key to verify the second signing value to obtain the second authentication result and sends the second authentication result to the authentication plugin.

Step w5, after the authentication plugin receives the device authentication data and the user logon information via the website, the authentication plugin sends a second authentication request including the device authentication data and the user identification of the user logon information;

In this case, that the authentication plugin receives the device authentication data and the user logon information via the website specifically includes that the third function of the authentication plugin is invoked and the authentication plugin receives the device authentication data and the user logon information from the website.

In Embodiment 2, the third function of the authentication plugin specifically is onUserTwofactorAuthenticate function.

Step w6, the authentication plugin receives the second authentication result from the authentication server;

Step w7, the authentication plugin sends the second authentication result which is used for verify whether the user logs on successfully.

In Embodiment 2, that the website verifies whether the user logs on successfully specifically includes that the website determines whether the user logs on successfully according to the second authentication result, if yes, the website displays successful logon via the browser and ends the authentication process; otherwise, the website displays failed logon via the browser and ends the authentication process.

In Embodiment 2, after Step w4, before Step w5, the method further includes that the authentication device sends device authentication data to the browser; the browser sends the device authentication data and the user logon information to the website.

Further, before w1, the method includes that the browser obtains the user logon information and sends the obtaining device authentication request including the user identification of the user logon information to the authentication plugin.

Further, that the browser obtains the user logon information and sends the obtaining device authentication request including the user identification of the user logon information to the authentication plugin specifically includes that, after a browser script of the browser monitors a logon click event, the browser script obtains user logon information on the browser page and generates the obtaining device authentication request including the user identification of the user logon information, sends the obtaining device authentication request of the user logon information to the authentication plugin; correspondingly, that the browser sends the device authentication data and the user logon information specifically includes that the browser script of the browser sends the device authentication data and the user logon information to the website.

Further, after the authentication device sends device authentication data to the browser, the method further includes that the browser assigns the device authentication data to hidden form item on the browser page;

That the browser sends the device authentication data and the user logon information to the website specifically includes that the browser sends the hidden form item and the user logon information to the website.

In Embodiment 2, before Step w2, the method further includes that the authentication plugin initializes the session channel with the authentication server.

In this case, that the authentication plugin initializes the session channel with the authentication server includes that the authentication plugin initializes the session channel with the authentication server according to the preset application configuration.

Embodiment 2 provides a method integrates the authentication device and the website, which realizes the registering and authentication of a user on a website.

Embodiment 3

Figure 3:
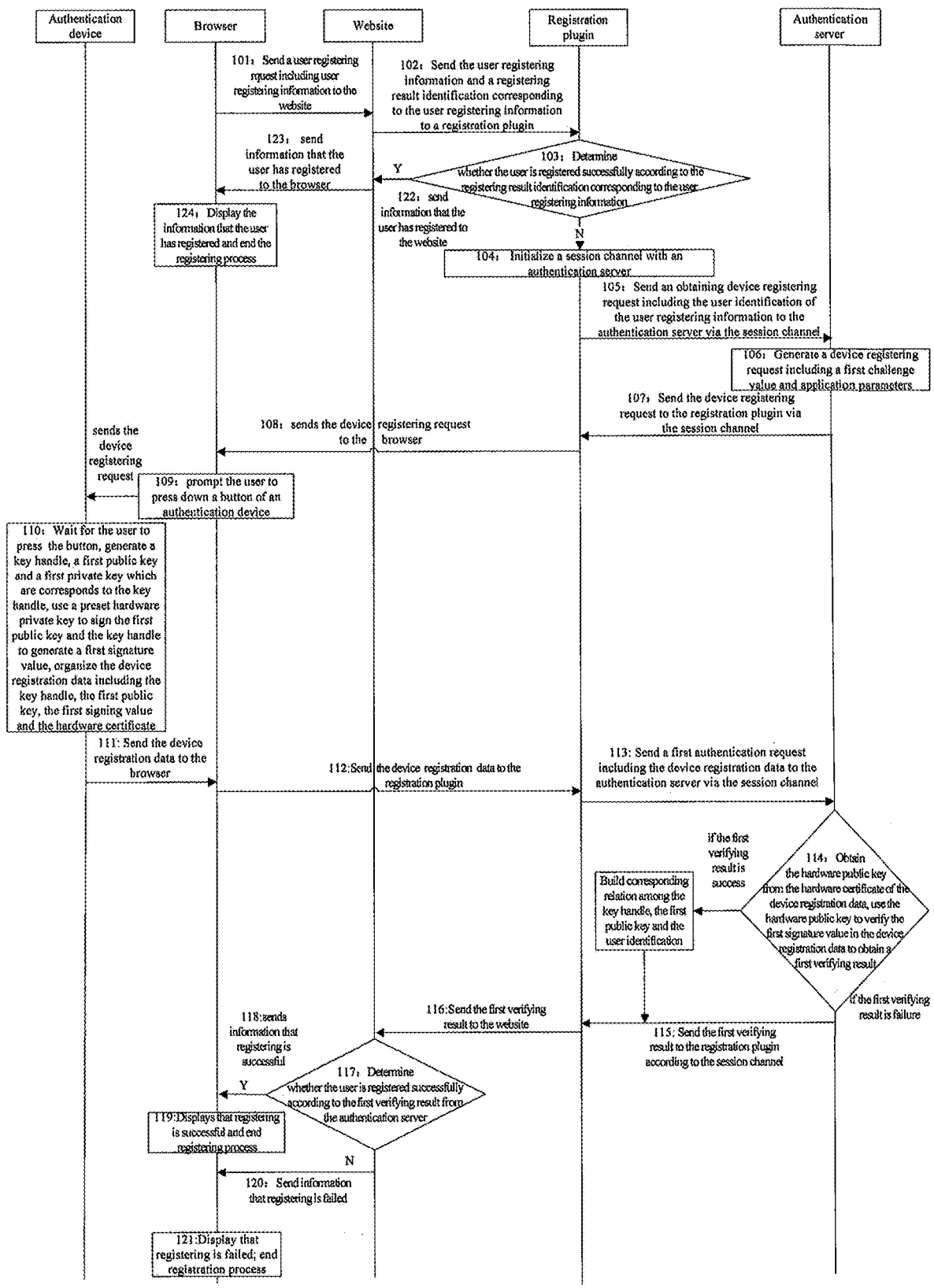
FIG. 3 is a flowchart of a registering process in a method for integrating an authentication device and a website provided in Embodiment 3 of the present invention.

Embodiment 3 provides a method for integrating an authentication device and a website, which includes registering method and authenticating method. As shown in FIG. 3, the integrating method includes:

in Embodiment 3, the website specifically is a website developed by Joomla technology.

Step 101, a browser sends a user registration request including user registration information to the website;

Step 102, the website sends the user registration information and a registering result identification corresponding to the user registration information to a registration plugin;

In Embodiment 3, the registration plugin is user type.

Specifically, after the website receives the user registration request of the user registration information from the browser, the website stores the user registration information in a database, obtains the registering result identification corresponding to the user registration information, takes the user registration information and the registering result identification corresponding to the user registration information as parameters, invokes a first function of the registration plugin, sends the user registration information and the registering result identification corresponding to the user registration information to the registration plugin.

In Embodiment 3, the user registration information can includes user identification, user password and user e-mail, etc. In this case, the user identification is unique identification information used for identify a user.

Step 103, the registration plugin determines whether the user is registered successfully according to the registering result identification corresponding to the user registration information, After the first function of the registration plugin is invoked, the registration plugin receives the user registration information and the registration result identification corresponding to the user registration information from the website, determines whether the registering result identification corresponding to the user registration information is successful identification true, if yes, the user is determined to be registered successfully, Step 122 is executed; otherwise, the user is determined not to be registered successfully, then Step 104 is executed successfully.

In Embodiment 3, the first function of the registration plugin specifically is on UserAfterSave function.

Step 104, the registration plugin initializes a session channel with an authentication server; Specifically, the registration plugin initializes the session channel with an authentication server according to preset application configuration information.

In Embodiment 3, the preset application configuration information includes a preset application identification appid, a preset application authentication sequence number appkey, a preset application uniform resource locator appurl and preset information of protecting host of application app_protected_host, etc.

For example, $appid=$this→params→get('app_id', 'app_id');

$appkey=$this→params→get('app_key', 'app_key');
$appurl=$this→params→get('app_host', 'app_host');
$app_protected_host=$this→params→get('app_protected_host', 'app_protected_host');
$CloudentifyU2FSDK=new CloudentifyU2FRequest( );
$CloudentifyU2FSDK→initU2F($appid, $appurl, $app_protected_host);

Step 105, the registration plugin sends an obtaining device registering request including the user identification of the user registration information to the authentication server via the session channel;

Step 106, the authentication server generates a device registering request including a first challenge value and application parameters;

Step 107, the authentication server sends the device registering request to the registration plugin via the session channel;

Step 108, the registration plugin sends the device registering request to the browser;

Specifically, the registration plugin generates a first website address redirecting request including the device registering request and sends the first website redirecting request including the device registering request to the browser.

For example,
$url=JURL:root(true).
"/plugins/user/cloudentifyu2fenroll/cloudentifyu2f/CloudentifyU2FEnroll.php?";
$url=$url."u2f-enrollurl=".urlencode(JURL:root(true));
$url=$url."&u2f-app=".urlencode($appid);
$url=$url."&u2f-appurl=".urlencode($appurl);
$url=$url."&u2f-challenge=".urlencode($enroll→challenge); in this case, parameter
u2f-challenge is the first challenge value;
$url=$url."&u2f-appId=".urlencode($enroll→appId); in this case, u2f-appId is application parameter;
$url=$url."&u2f-sessionId=".urlencode($enroll→sessionId);
$url=$url."&u2f-version=".urlencode($enroll→version);
$app→redirect($url);

It should be noted that URL redirection refers to a technology that a user is redirected to another website when the user views a website. In embodiment 3, by that the registration plugin sends the website redirecting request including the device registering request to the browser, the technical effect that the user is directed to a website address of webpage waiting for registering when the user is registering on a website.

Step 109, the browser prompts the user to press down a button of an authentication device and sends the device registering request to the authentication device;

Specifically, the browser displays the page of waiting for registering to a user, prompts the user to press down the button of the authentication device on the page of waiting for registering and sends the authentication device to send the device registering request.

Step 110, The authentication device waits for the user to press the button, generates a key handle, a first public key and a first private key which are corresponds to the key handle, uses a preset hardware private key to sign the first public key and the key handle to generate a first signing value, organizes the device registration data including the key handle, the first public key, the first signing value and the hardware certificate;

In this case, the hardware certificate includes a hardware public key.

Step 111, the authentication device sends the device registration data to the browser;

Step 112, the browser sends the device registration data to the registration plugin;

Step 113, the registration plugin sends a first authentication request including the device registration data to the authentication server via the session channel;

Step 114, the authentication server obtains the hardware public key from the hardware certificate of the device registration data, uses the hardware public key to verify the first signing value in the device registration data to obtain a first verifying result, if the first verifying result is success, builds corresponding relation among the key handle, the first public key and the user identification and execute Step 115; if the first verifying result is failure, execute Step 115;

Step 115, the authentication server sends the first verifying result to the registration plugin according to the session channel;

Step 116, the registration plugin sends the first verifying result to the website;

Step 117, the website determines whether the user is registered successfully according to the first verifying result from the authentication server, if yes, execute Step 118; otherwise, execute Step 120;

After receiving the first verifying result returned by the registration plugin, the website determines whether the first verifying result is TRUE, if yes, it determines that the user registered successfully and the registering result identification corresponding to the user registration information is set as successful identification, execute Step 118; otherwise, it determines that the user registered unsuccessfully, execute Step 120.

Step 118, the website sends information that registering is successful to the browser;

Step 119, the browser displays that registering is successful and ends registering process.

Step 120, the website sends information that registering is failed to the browser;

Step 121, the browser displays that registering is failed and ends registering process.

Step 122, the registration plugin sends information that the user has registered to the website;

Step 123, the website sends information that the user has registered to the browser;

Step 124, the browser displays the information that the user has registered and ends the registering process.

In Embodiment 3, Step 109 can be replaced by that the browser displays the page of waiting for registering and sends the device registering request to the authentication device; Step 110 further includes that the authentication device prompts the user to press the button of the authentication device.

Correspondingly, Step 108 specifically includes that the registration plugin generates a second website address redirecting request including the device registering request, sends the second website address redirecting request including the device registering request. That the browser displays the registering waiting page and sends the device registering request to the authentication device specifically includes that the browser displays the registering waiting page for the user according to the second website address redirecting request and sends the device registering request in the second website address redirecting request to the authentication device.

Figure 4:
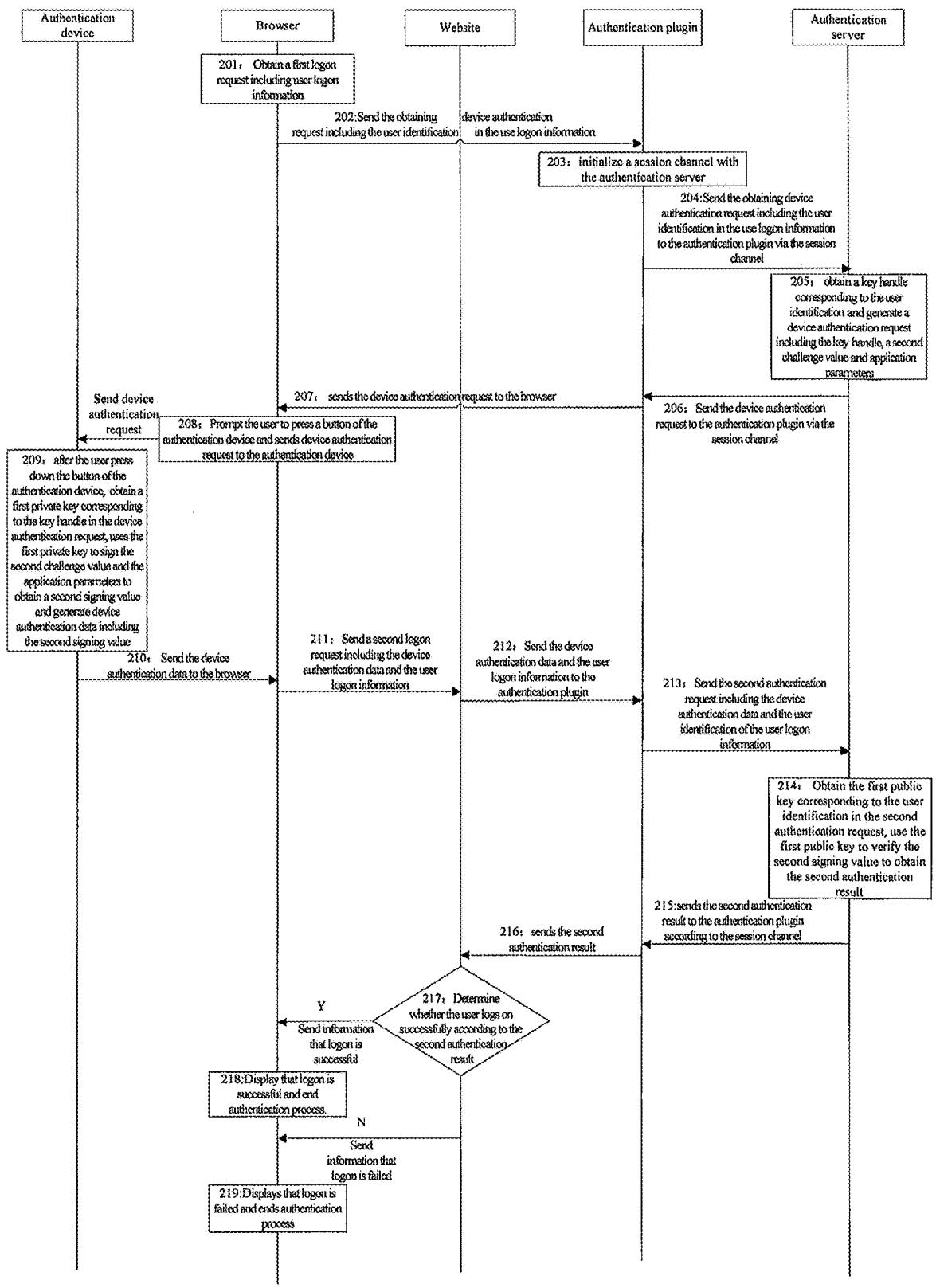
FIG. 4 is a flowchart of an authenticating process in a method for integrating an authentication device and a website provided in Embodiment 1 of the present invention.

The authenticating method of the method of integrating the authentication device and the website provided in Embodiment 3, as shown in FIG. 4, includes the following steps.

Step 201, the browser obtains a first logon request including user logon information;

After a browser script of the browser monitors a logon clicking event, the browser script obtains the first logon request including the user logon information of a browser page and generates the obtaining device authentication request including a user identification in the logon information.

Preferably, the browser script is JavaScript, briefly as JS script. The user logon information includes the user identification and a user password.

Step 202, the browser sends the obtaining device authentication request including the user identification in the use logon information to the authentication plugin;

In Embodiment 3, the type of the authentication plugin is twofactorauth type.

Specifically, the browser script uses post( ) method of ajax to send the obtaining device authentication request including the user identification in the use logon information to the authentication plugin.

After the browser script uses post( ) method of ajax to send the obtaining device authentication request including the user identification in the use logon information to the authentication plugin, the second function in the authentication plugin is invoked and receives the obtaining device authentication request including the user identification in the use logon information.

In Embodiment 3, the second function of the authentication plugin is specifically onAfterRender function.

Step 203, the authentication plugin initializes a session channel with the authentication server;

Specifically, the authentication plugin initializes a session channel with the authentication server according to preset configuration information.

In Embodiment 3, the preset application configuration information includes a preset application identification appid, a preset application authentication sequence number appkey, a preset application unified resource locator appurl and a preset application protecting host information app_protected_host, etc.

For example,
$appid=$this-params→get('app_id', 'app_id');
$appkey=$this→params→get('app_key', 'app_key');
$appurl=$this→params→get('app_host', 'app_host');
$app_protected_host=$this→params→get('app_protected_host', 'app_protected_host');
$CloudentifyU2FSDK=new CloudentifyU2FRequest( );
$CloudentifyU2FSDK→initU2F($appid, $appurl, $app_protected_host);

Step 204, the authentication plugin sends the obtaining device authentication request including the user identification in the use logon information to the authentication plugin via the session channel;

Step 205, the authentication server obtains a key handle corresponding to the user identification and generates a device authentication request including the key handle, a second challenge value and application parameters;

Step 206, the authentication server sends the device authentication request to the authentication plugin via the session channel;

Step 207, the authentication plugin sends the device authentication request to the browser;

Specifically, the second function in the authentication plugin sends the device authentication request to the browser script of the browser via echo sentence.

Step 208, the browser prompts the user to press a button of the authentication device and sends device authentication request to the authentication device.

Specifically, the browser script prompts the user to press down the button of the authentication device on the authentication waiting page of the browser and sends the device authentication request to the authentication device.

Step 209, after the user press down the button of the authentication device, the authentication device obtains a first private key corresponding to the key handle in the device authentication request, uses the first private key to sign the second challenge value and the application parameters to obtain a second signing value and generates device authentication data including the second signing value;

Step 210, the authentication device sends the device authentication data to the browser;

Specifically, after the browser receives the device authentication data of the authentication device, the browser script of the browser assign the device authentication data to the secret key, which is an hidden form item on the browser page.

Step 211, the browser sends a second logon request including the device authentication data and the user logon information to the website;

Specifically, the browser script sends the second logon request including the device authentication data and the user logon information to the website.

Step 212, the website sends the device authentication data and the user logon information to the authentication plugin;

After the website sends the device authentication data and the user logon information to the authentication plugin, the third function of the authentication plugin is invoked and the authentication plugin receives the device authentication data and the user logon information from the website.

In Embodiment 3, the third function of the authentication plugin specifically is onUserTwofactorAuthenticate function.

Step 213, the authentication plugin sends the second authentication request including the device authentication data and the user identification of the user logon information to the authentication server;

Step 214, the authentication server obtains the first public key corresponding to the user identification in the second authentication request, uses the first public key to verify the second signing value to obtain the second authentication result;

Step 215, the authentication server sends the second authentication result to the authentication plugin according to the session channel;

Step 216, the authentication plugin sends the second authentication result to the website;

Step 217, the website determines whether the user logs on successfully according to the second authentication result, if yes, sends information that logon is successful to the browser and the browser executes Step 218; otherwise, sends information that logon is failed to the browser and the browser executes Step 219;

Specifically, the website determines whether the second authentication result is true, if yes, it determines that user logs on successfully, the browser executes Step 218; otherwise, it determines that the user logs on failed, the browser executes Step 219.

Step 218, the browser displays that logon is successful and ends authentication process.

Step 219, the browser displays that logon is failed and ends authentication process.

Step 208 of the Embodiment 3 can be replaced by that the browser sends the device authentication request to the authentication device and displays authentication waiting page;

Correspondingly, after the authentication device receives the device authentication request and before waiting for the user to press down the button in Step 209, the method further includes that the authentication device prompts the user to press down the button of the authentication device.

Embodiment 4

Figure 5:
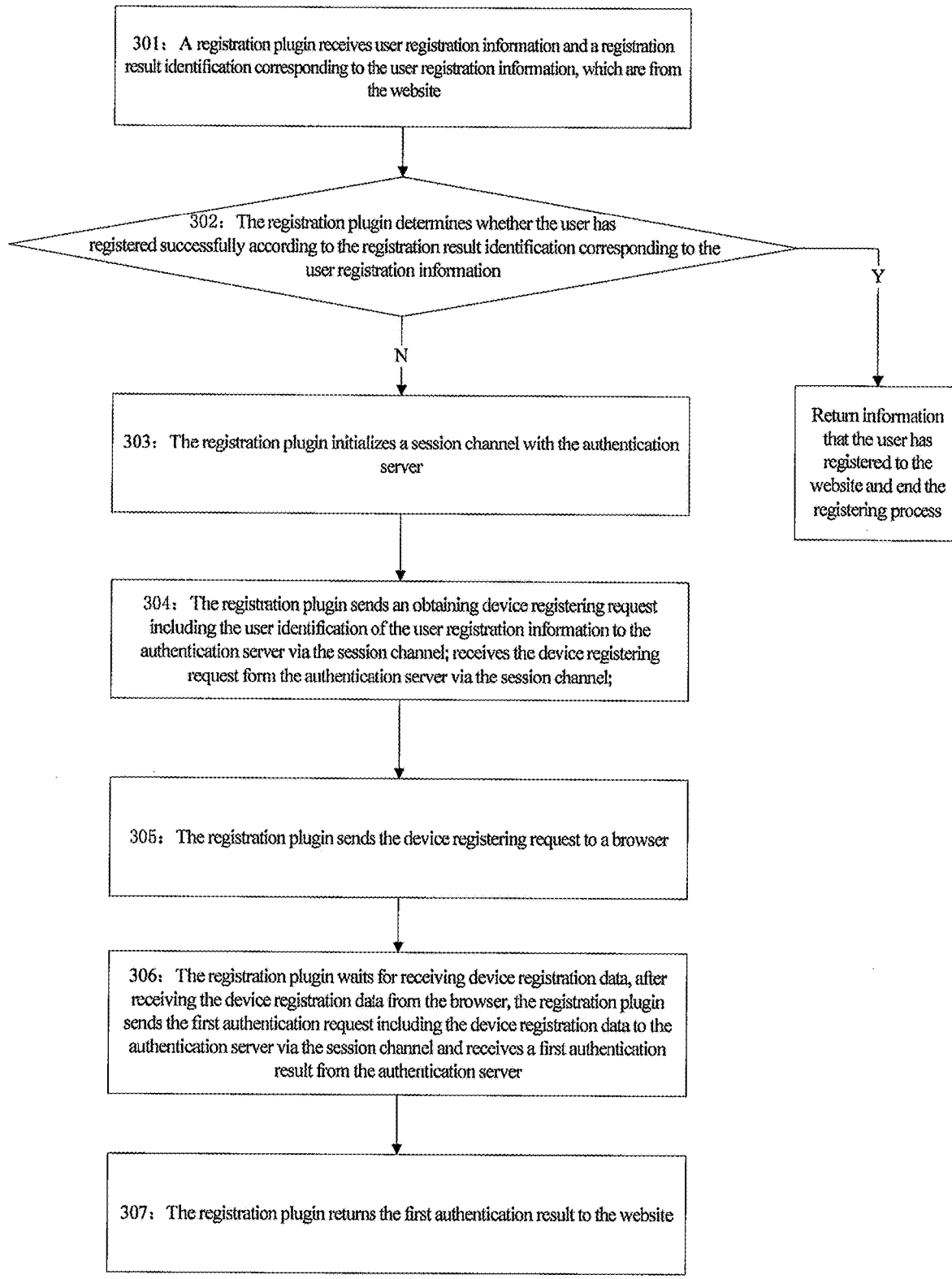
FIG. 5 is a flowchart of a registering process in a method for integrating an authentication device and a website provided in Embodiment 4 of the present invention.
Figure 6:
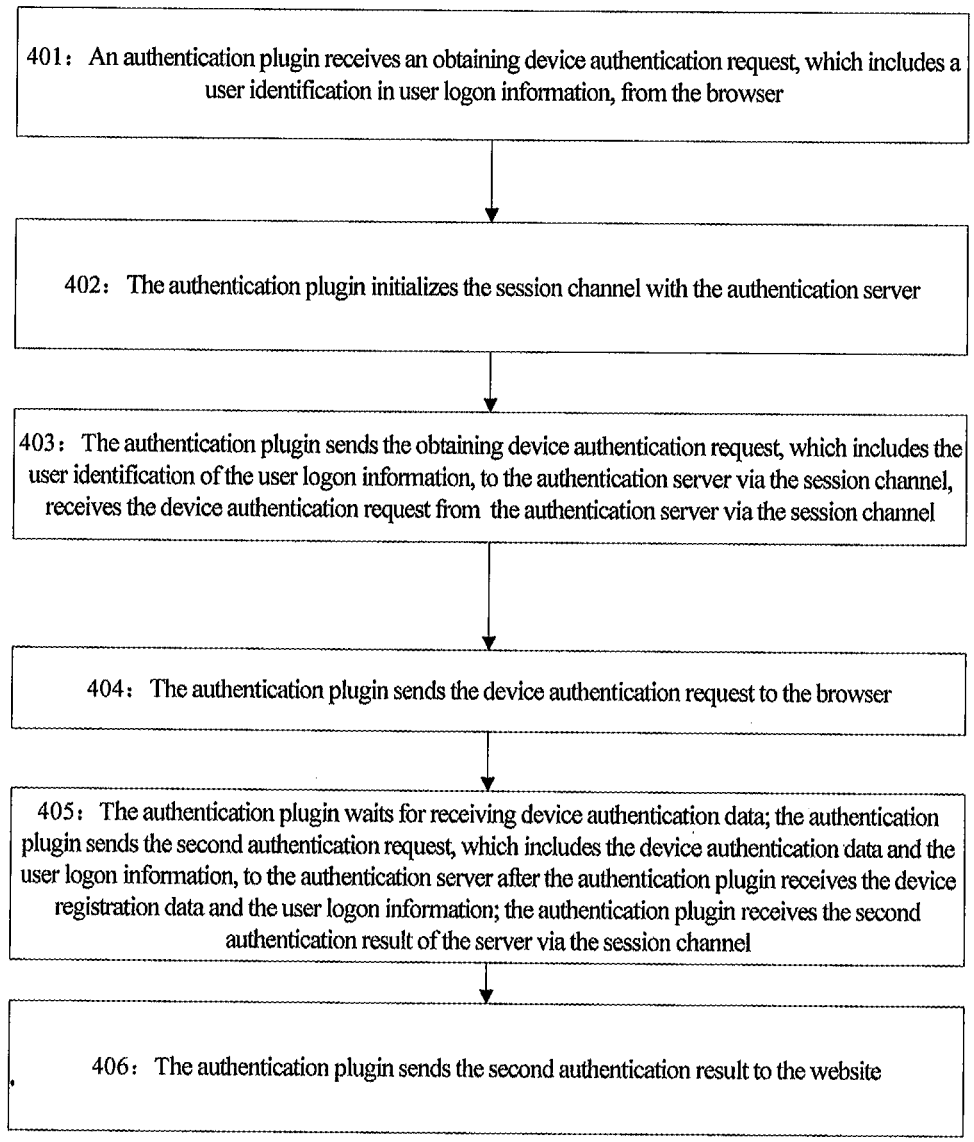
FIG. 6 is a flowchart of an authenticating process in a method for integrating an authentication device and a website provided in Embodiment 4 of the present invention.

Embodiment 4 provides a method of integrating an authentication device and a website, which includes a registering method and an authenticating method. As shown in FIG. 5, the method includes the following steps.

In Embodiment 4, the website specifically is a website developed by using Joomla technology.

Step 301, a registration plugin receives user registration information and a registration result identification corresponding to the user registration information, which are from the website.

Specifically, after the website receives a user registration request including the user registration information, the website stores the user registration information in a database, obtains the registration result identification corresponding to the user registration information, takes the user registration information and the registration result identification corresponding to the user registration information, invokes a first function of the registration plugin, sends the user registration information and the registration result identification corresponding to the user registration information to the registration plugin.

After the first function of the registration plugin is invoked, the registration plugin receives the user registration information and the registration result identification corresponding to the user registration information, which are from the website.

In Embodiment 4, the user registration information can includes a user identification, a user password and email of a user, etc.

In this case, the user identification is unique identified information to identify a user. Preferably, the user identification is user name.

In Embodiment 4, the first function of the registration plugin is specifically on UserAfterSave function.

Step 302, the registration plugin determines whether the user has registered successfully according to the registration result identification corresponding to the user registration information, if yes, return information that the user has registered and end the registering process; otherwise, execute Step 303.

Specifically, the registration plugin determines whether the registration result identification corresponding to the user registration information is true, if yes, the registration plugin determines that the user has been registered successfully and returns information that the registration plugin has been registered already and ends the registering process; otherwise, the registration plugin determines that the user has not registered successfully and execute Step 303.

Step 303, the registration plugin initializes a session channel with the authentication server;

Specifically, the registration plugin initializes the session channel with the authentication server according to preset application configuration information.

In Embodiment 4, the preset application configuration information includes a preset application identification appid, a preset application authentication sequence number appkey, a preset unified resource locator appurl and a preset application protection host information app_protected_host, etc.

For example, $appid=$this→params→get('app_id', 'app_id');

$appkey=$this→params→get('app_key', 'app_key');
$appurl=$this→params→get('app_host', 'app_host');
$app_protected_host=$this→params→get('app_protected_host', 'app_protected_host');
$CloudentifyU2FSDK=new CloudentifyU2FRequest( );
$CloudentifyU2FSDK→initU2F($appid, $appurl, $app_protected_host);

Step 304, the registration plugin sends an obtaining device registering request including the user identification of the user registration information to the authentication server via the session channel; receives the device register request form the authentication server via the session channel;

For example,
$urlstring=$CloudentifyU2FSDK→getUrl($user['username'], $app_protected_host, "enrollData");
$resp_data=" ";
$ret=$CloudentifyU2FSDK→do_http($urlstring,$resp_data); In this case, resp_data is the received device register request from the authentication server.

In Embodiment 4, after the authentication server receives the obtaining device registering request from the authentication plugin, the authentication server generates the device registering request including the first challenge value and the application parameters and sends the device registering request to the registration plugin via the session channel.

Step 305, the registration plugin sends the device registering request to a browser;

Specifically, the registration plugin generates a first website address redirecting request including the device registering request and sends the first website address redirecting request including the device registering request to the browser.

For example,
$url=JURI:root(true).
"/plugins/user/cloudentifyu2fenroll/cloudentifyu2f/
　CloudentifyU2FEnroll.php?";
$url=$url."u2f-enrollurl=".urlencode(JURI:root(true));
$url=$url."&u2f-app=".urlencode($appid);
$url=$url."&u2f-appurl=".urlencode($appurl);
$url=$url."&u2f-challenge=".urlencode($enroll→challenge); in this case, the parameter u2f-challenge is the first challenge value;
$url=$url."&u2f-sessionId=".urlencode($enroll→sessionId);
$url=$url."&u2f-version=".urlencode($enroll→version);
$app→redirect($url);

In Embodiment 4, after the registration plugin sends the first website address redirecting request including the device request to the browser, the browser prompts the user to press the button of the authentication device and sends the device register request to the authentication device; the authentication device waits for the user to press the button, then the authentication device generates a key handle, the first public key and the first private key which are corresponding to the key handle, signs the first public key and the key handle by using the preset hardware private key, organizes the device registration data including the key handle, the first public key, the first public key, the first signing value and the hardware certificate, sends the device registration data to the browser, the browser sends the device registration data to the registration plugin.

In Embodiment 4, Step 305 specifically is that: the registration plugin generates a second website redirecting request including the device registering request, sends the a second website redirecting request including the device registering request to the browser. Correspondingly, when the browser receives the second website redirecting request including the device registering request, the browser displays a page of waiting registering and sends the device registering request to the authentication device. The authentication device prompts the user to press down a button of the authentication device; after the user pressed down the key, the authentication device generates a key handle, the first public key and the first private key which are corresponding to the key handle, signs the first public key and the key handle by using the preset hardware private key, organizes the device registration data including the key handle, the first public key, the first public key, the first signing value and the hardware certificate, sends the device registration data to the browser, the browser sends the device registration data to the registration plugin.

It should be noted that, URL redirection, which is an abbreviation of Uniform Resource Location redirection, refers to technology to direct the user to another website when the user is viewing a website. In Embodiment 4, the technology that the registration plugin sends the web address redirection request including the device registering request to the browser can realizes that, when the user registers on a website, the user is directed to a web address of a page of waiting for registering.

Step 306, the registration plugin waits for receiving device registration data, after receiving the device registration data from the browser, the registration plugin sends the first authentication request including the device registration data to the authentication server via the session channel and receives a first authentication result from the authentication server;

In Embodiment 4, after the authentication server receives the first authentication request including the device registration data via the session channel, the authentication server obtains the hardware public key from the hardware certificate in the device registration data, uses the hardware public key to verify the first signing value in the device registration data to obtain the first authentication result, if the first authentication result is successful, builds corresponding relation among the key handle, the first public key and the user identification and sends the first authentication result to the registration plugin; if the first authentication result is failure, sends the first authentication result to the registration plugin.

Step 307, the registration plugin returns the first authentication result to the website.

After the website receives the first authentication result from the registration plugin, the website determines whether the first authentication result is TRUE, if yes, the website determines that the user is registered successfully and sets the registration result identification corresponding to the user registration information to be successful identification and sends information of successful register to the browser and the browser displays that register is successful; otherwise, the website determines that the user is registered unsuccessfully and sends information of failed register to the browser; the browser displays that register is failed.

As shown in FIG. 4, the authenticating method in the method for integrating an authentication device and a website provided in Embodiment 4 includes the following steps.

Step 401, an authentication plugin receives an obtaining device authentication request, which includes a user identification in user logon information, from the browser;

In Embodiment 4, the type of the authentication plugin is twofactorauth type.

After a browser script in the browser monitors a logon clicking event, the browser script obtains a first logon request of user, which includes user logon information at a browser page, generates the obtaining device authentication request, which includes the user identification in the user logon information, sends the obtaining device authentication request to the authentication plugin, the authentication plugin receives the obtaining device authentication request.

Specifically, after the browser script of the browser monitors the logon click event, the browser script obtains the first logon request of user, which includes the user logon information, from the browser page, generates the obtaining device authentication request including the user identification of the user logon information, uses the post( ) method of ajax to send the obtaining device authentication request, which includes the user logon information, to the authentication plugin. After the browser script uses the uses the post( ) method of ajax to send the obtaining device authentication request, which includes the user logon information, to the authentication plugin, a second function in the authentication plugin is invoked, the authentication plugin receives the obtaining device authentication request, which includes the user logon information.

Preferably, the browser script is JavaScript, briefly JS script. The user logon information includes user identification and user password.

In Embodiment 4, the second function of the authentication plugin is onAfterRender function.

Step 402, the authentication plugin initializes the session channel with the authentication server;

Specifically, the authentication plugin initializes the session channel with the authentication server according to application configuration information.

In Embodiment 4, the preset application configuration information includes a preset application identification appid, a preset application authentication sequence number appkey, a preset application unified resource locator appurl and a preset application protecting host information app_protected_host, etc.

For example, $appid=$this→params→get('app_id', 'app_id');
$appkey=$this→params→get('app_key', 'app_key');
$appurl=$this→params→get('app_host', 'app_host');
$app_protected_host=$this→params→get('app_protected_host', 'app_protected_host');
$CloudentifyU2FSDK=new CloudentifyU2FRequest( );
$CloudentifyU2FSDK→initU2F($appid, $appurl, $app_protected_host);

Step 403, the authentication plugin sends the obtaining device authentication request, which includes the user identification of the user logon information, to the authentication server via the session channel, receives the device authentication request from the authentication server via the session channel;

For example, $urlstring=$CloudentifyU2FSDK→getUrl($username, $app_protected_host,"signData");

$resp_data=" ";

$ret=$CloudentifyU2FSDK→do_http($urlstring,$resp_data); In this case, resp_data is the device authentication request received from the authentication server.

In Embodiment 4, after the authentication server receives the obtaining device authentication request, which includes the user identification of the user logon information, from the authentication plugin, the authentication server obtains the key handle corresponding to the user identification, generates the key handle, a second challenge value and application parameters; the authentication server sends the device authentication request to the authentication plugin via the session channel.

Step 404, the authentication plugin sends the device authentication request to the browser;

Specifically, Step 404 is that the second function of the authentication plugin sends the device authentication request to the browser script of the browser via echo sentence.

In Embodiment 4, after the authentication plugin sends the device authentication request to the browser, the browser prompts the user to press a button of the authentication device and sends the device authentication request to the authentication device; after the user presses down the button of the authentication device, the authentication plugin obtains the first private key corresponding to the key handle in the device authentication request, uses the first private key to sign the second challenge value and the application parameter to obtain a second signing value, generates the device authentication data including the second signing value; the browser sends a second logon request of user, which includes the device authentication data and the user logon information, to the website; the website sends the device authentication data and the user logon information to the authentication plugin.

Specifically, the second function in the authentication plugin sends the device authentication request to the browser script of the browser via the echo sentence, the browser script prompts the user to press the button of the authentication device at a page of waiting for authenticating of the browser, sends the device authentication request to the authentication device; after the user presses the button of the authentication device, the authentication device obtains the first private key corresponding to the key handle in the device authentication request, uses the first private key to sign the second challenge value and the application parameters to obtain the second signing value and generates the device authentication data including the second signing value; the authentication device sends the device authentication data to the browser; after the browser receives the device authentication data of the authentication device, the browser script assigns the device authentication data to a hidden form item "secretkey" on the browser page, sends the second logon request of user, which includes the device authentication data and the user logon information, to the website, the website takes the device authentication data and the user logon information as parameters and invokes the third function of the authentication plugin.

In Embodiment 4, specifically, the third function of the authentication plugin is on UserTwofactorAuthenticate function.

Step 405, the authentication plugin waits for receiving device authentication data; the authentication plugin sends the second authentication request, which includes the device authentication data and the user logon information, to the authentication server after the authentication plugin receives the device registration data and the user logon information; the authentication plugin receives the second authentication result of the server via the session channel;

Specifically, the authentication plugin waits for receiving the device authentication data; after receiving the device registration data and the user logon information from the website, a third function of the authentication plugin is invoked, the authentication plugin sends the second authentication request, which includes the device authentication data and the user identification of the user logon information to the authentication server, receives the second authentication result from the authentication server via the session channel.

In this case, one way for implementing sending the second authentication request, which includes the device authentication data and the user identification of the user logon information to the authentication server and receiving the second authentication result from the authentication server via the session channel is shown as follows.

$check=$this→validateCloudentifyOTP($appid, $appkey, $appurl, $otp, $username); in which otp is the device authentication data, username is the user identification, check is the second authentication result received from the authentication server.

In Embodiment 4, after the authentication server receives the second authentication request, which includes the device authentication data and the user identification of the user logon information via the session channel, the authentication server obtains the first public key corresponding to the user identification in the second authentication request, verifies the second signing value by using the first public key to obtain the second authentication result, sends the second authentication result to the authentication plugin via the session channel.

Step 406, the authentication plugin sends the second authentication result to the website;

After the website receives the second authentication result from the authentication plugin, the website determines whether the second authentication result is TRUE, if yes, it determines that the user logs on successfully and the website sends information of successful logon to the browser and the browser displays that logon is successful, the authentication procedure is ended; otherwise, it determines that the user logs on unsuccessfully, the website sends information of failed logon t the browser, the authentication procedure is ended.

Embodiment 5

Figure 7:
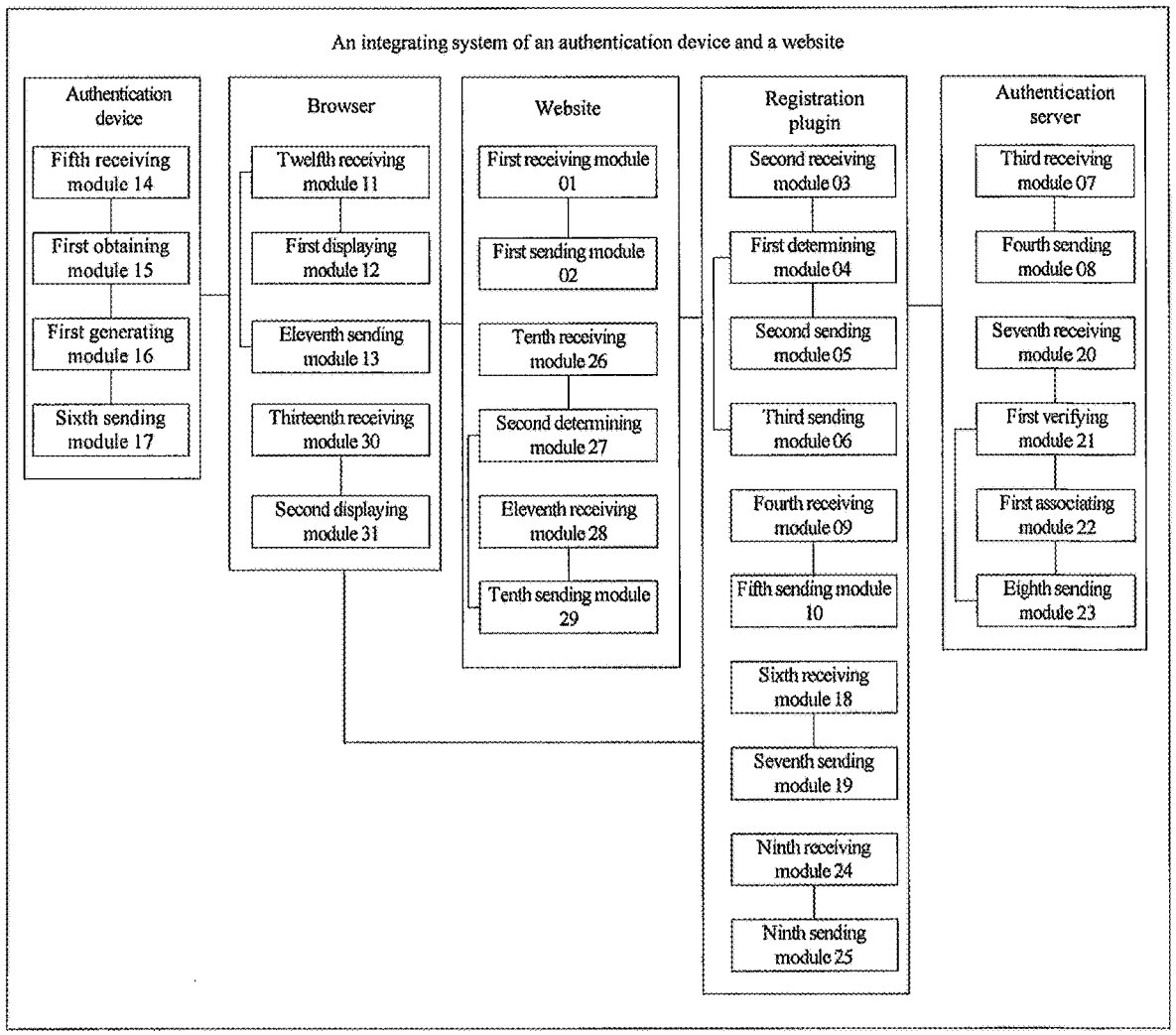
FIG. 7 is a block diagram of a system for integrating an authentication device and a website provided in Embodiment 5.

Embodiment 5 provides an integrating system of an authentication device and a website. As shown in FIG. 7, the integrating system includes an authentication device, a browser, a website, a registration plugin and an authentication server;

In Embodiment 5, specifically the website is developed by using Joomla technology.

The website includes a first receiving module 01, a first sending module 02, a tenth receiving module 26, a second determining module 27, an eleventh receiving module 28 and a tenth sending module 29;

the registration plugin includes a second receiving module 03, a first determining module 04, a second sending module 05, a third sending module 06, a fourth receiving module 09, a fifth sending module 10, a sixth receiving module 18, a seventh sending module 19, a ninth receiving module 24 and a ninth sending module 25;

the authentication server includes a third receiving module 07, a fourth sending module 08, a seventh receiving module 20, a first verifying module 21, a first associating module 22 and an eighth sending module 23;

the authentication device includes a fifth receiving module 14, a first obtaining module 15, a first generating module 16 and a sixth sending module 17;

the browser includes a twelfth receiving module 11, the eleventh sending module 13, the first displaying module 12, the thirteenth receiving module 30 and a second displaying module 31;

the first receiving module 01 is configured to receive user registration information via the browser;

the first sending module 02 is configured to send the user registration information and a registration result identification corresponding to the user registration information to the registration plugin;

the first sending module 02 specifically is configured to invoke a first function of the registration plugin to the user registration information and the registration result identification corresponding to the user registration information to the registration plugin.

In Embodiment 5, the first function of the registration plugin specifically is on UserAfterSave function.

The second receiving module 03 is configured to receive the user registration information and the registration result identification corresponding to the user registration information from the website;

the first determining module 04 is configured to determine whether a user has registered successfully according to the registration result identification;

the first determining module 04 specifically is configured to determine whether the registration result identification corresponding to the user registration information is success identification, if yes, it determines that the user has registered successfully; otherwise, it determines that the user has registered unsuccessfully.

The second sending module 05 is configured to send information that the user has registered already to the website after the first determining module 04 determines that the registration result identification corresponding to the user registration information is success identification;

the third sending module 06 is configured to send an obtaining device registration request, which includes a user identification of the user registration information, to the authentication server after the first determining module 04 determines that the registration result identification corresponding to the user registration information is not success identification;

the third receiving module 07 is configured to receive the obtaining device registration request, which includes a user identification of the user registration information, from the registration plugin;

the fourth sending module 08 is configured to send a device registration request, which includes a first challenge value and application parameters, to the registration plugin;

the fourth receiving module 09 is configured to receive the device registration request, which includes the first challenge value and the application parameters of the authentication server, from the authentication server;

the fifth sending module 10 is configured to send the device registration request to the browser;

the fifth sending module 10 specifically includes a first generating unit and a first sending unit;

the first generating unit is configured to generate a first URL direction request including the device registration request;

the first sending unit is configured to send the first URL direction request including the device registration request to the browser.

the twelfth receiving module 11 is configured to receive the device registration request from the registration plugin;

the twelfth receiving module 11 specifically is configured to receive the first URL redirection request of the device registration request, which includes the first challenge value and the application parameters of the authentication server, from the registration plugin.

the first displaying module 12 is configured to prompt the user to press a button on the authentication device at the page of waiting for registration after the twelfth receiving module 11 receives the device registration request;

the first displaying module 12 specifically is configured to displays the page of waiting for registration to the user according to the first URL redirection request and prompt the user to press a button on the authentication device at the page of waiting for registration.

The eleventh sending module 13 is configured to send the device registration request to the authentication device;

the eleventh sending module 13 is specifically configured to send the device registration request included in the first URL redirection request.

the fifth receiving module 14 is configured to receive the device registration request from the browser;

the first obtaining module 15 is configured to, after the fifth receiving module 14 receives the device registration request, wait for the user to press the button and obtain information that the user has pressed the button;

the first generating module 16 is configured to, after the first obtaining module 15 obtains the information that the user has pressed the button, generate a key handle according to the first challenge value and the application parameters in the device registration request, the first public key and the first private key which are corresponds to the key handle, use a preset hardware key to sign the first public key and the key handle to generate a first signing value and organize device registration data including the key handle, the first public key, the first signing value and the hardware certificate;

the sixth sending module 17 is configured to send the device registration data device registration data, which includes the key handle, the first public key, the first signing value and the hardware certificate, generated by the first generating module 16 to the registration plugin via the browser;

the sixth receiving module 18 is configured to receive the device registration data, which includes the key handle, the first public key, the first signing value and the hardware certificate, from the browser;

the seventh sending module 19 is configured to send the first authentication request, which includes the device registration data, to the authentication server;

the seventh receiving module 20 is configured to receive the first authentication request, which includes the device registration data, from the registration plugin;

the first verifying module 21 is configured to obtain a hardware public key from the hardware certificate of the first authentication request received by the seventh receiving module 20, use the hardware public key to verify the first signing value to obtain a first authentication result;

the first associating module 22 is configured to build corresponding relation among the key handle, the first public key and the user identification if the first authentication result is success;

the eighth sending module 23 is configured to, after the first associating module 22 builds corresponding relation among the key handle, the first public key and the user identification, send the first authentication result; send the first authentication result to the registration plugin if the first authentication result is failure.

the ninth receiving module 24 is configured to receive the first authentication result from the authentication server;

the ninth sending module 25 is configured to send the first authentication result to the website;

the tenth receiving module 26 is configured to receive the first authentication result from the registration plugin;

the second determining module 27 is configured to determine whether the user has registered successfully according to the first authentication result received by the tenth receiving module 26;

the eleventh receiving module 28 is configured to receive the information that the user has registered from the registration plugin;

the tenth sending module 29 is configured to send information of successful registration to the browser after the second determining module 27 determines that the user has registered successfully; send information of failed registration to the browser after the second determining module 27 determines that the user has registered unsuccessfully; send the information that the user has already registered to the browser after the eleventh receiving module 28 receives the information that the user has registered from the registration plugin;

the thirteenth receiving module 30 is configured to receive the information of successful registration, the information of failed registration or information that the user has registered from the website;

the second displaying module 31 is configured to display that the user has registered successfully after the thirteenth receiving module 30 receives information of successful registration; display that the user has registered unsuccessfully after the thirteenth receiving module 30 receives information of failed registration; display that the user has registered after the thirteenth receiving module 30 receives information that the user has registered.

In Embodiment 5, the website further includes a setting module;

the first setting module is configured to set a registration result identification corresponding to the user as successful identification after the second determining module 27 determines that the user has registered successfully.

In Embodiment 5, the authentication device further includes a third displaying module; correspondingly, the first displaying module 12 is configured to display the page of waiting for registering after the twelfth receiving module 11 receives the device registration request;

the third displaying module is configured to, after the fifth receiving module 14 receives the device registration request and before the first obtaining module 15 obtained the information that the user has pressed the button, prompt the user to press the button of the authentication device.

In the case that the authentication further include the third displaying module, the fifth sending module 10 further includes the second generating unit and the second sending unit; the second generating unit is configured to generate a second URL redirection request including the device registration request; the second sending unit is configured to send the second URL redirection request including the device registration request to the browser; the twelfth receiving module 11 is specifically configure to receive the second URL redirection request including the device registration request from the browser; the first displaying module 12 is specifically configured to display the page of waiting for registering to the user according to the second URL redirection request; the eleventh sending module 13 is specifically configured to send the device registration request in the second URL redirection request to the authentication device.

In Embodiment 5, the integrating system for integrating the authentication device and the website can further includes an authentication plugin besides the authentication device, the browser, the website, the registration plugin and the authentication server which are shown in FIG. 7; correspondingly, the browser further includes a second obtaining module, the twelfth sending module, the seventeenth receiving module, the fourth displaying module, the sixteenth sending module, the nineteenth receiving module, the eighteenth sending module, the twenty-fourth receiving module and the fifth displaying module;

the authentication plugin includes a fourteenth receiving module, the thirteenth sending module, the sixteenth receiving module, the fifteenth sending module, the twenty first receiving module, the twentieth sending module, the twenty-third receiving module and the twenty-second sending module;

the authentication server further includes a fifteenth receiving module, the third obtaining module, the fourteenth sending module, the twenty-second receiving module, the second verifying module and the twenty-first sending module;

the authentication device further includes an eighteenth receiving module, the fourth obtaining module, the second generating module and the seventeenth sending module;

the website further includes a twentieth receiving module, the nineteenth sending module, the twenty-fourth receiving module, the third determining module and the twenty-third sending module;

the second obtaining module is configured to obtain user logon information;

the second obtaining module is specifically configured to obtain the user logon information before the fourteenth receiving module receives the obtaining device authentication request including the user identification of the user logon information from the browser;

the twelfth sending module is configured to send the obtaining device authentication request including the user identification of the user logon information to the authentication plugin;

the twelfth sending module is specifically configured to invoke the second function in the authentication plugin to send the obtaining device authentication request including the user identification of the user logon information to the authentication plugin;

in Embodiment 5, the second function of the authentication plugin is specifically onAfterRender function.

the fourteenth receiving module is configured to receive the obtaining device authentication request from the browser;

the thirteenth sending module is configured to send the obtaining device authentication request to the authentication server;

the fifteenth receiving module is configured to receive the obtaining device authentication request from the authentication plugin;

the third obtaining module is configured to obtain the key handle corresponding to the user identification in the obtaining authentication device request;

the fourteenth sending module is configured to send the device authentication request including the key handle, the second challenge value of the authentication server and the application parameters;

the sixteenth receiving module is configured to receive the derive authentication request from the authentication server;

the fifteenth sending module is configured to send the device authentication request to the browser;

the seventeenth receiving module is configured to receive the device authentication request from the authentication plugin;

the fourth displaying module is configured to prompts the user to press the button of the authentication device at the page of waiting for authenticating;

the sixteenth sending module is configured to send the device authentication request to the authentication device;

the eighteenth receiving module is configured to receive the device authentication request from the browser;

the fourth obtaining module is configured to wait for the user to press the button and obtain the information that the user has pressed the button;

the second generating module is configured to obtain a private key corresponding to the key handle in the device authentication request, use the first private key to sign the second challenge value and the application parameters to generate the second signing value, generate the device authentication data including the second signing value;

the seventeenth sending module is configured to send the device authentication data to the browser;

the nineteenth receiving module is configured to receive the device authentication data from the authentication device;

the eighteenth sending module is configured to send the device authentication data and the user logon information to the website;

the twentieth receiving module is configured to receive the device authentication data and the user logon information from the browser;

the nineteenth sending module is configured to send the device authentication data and the user logon information to the authentication plugin;

the nineteenth sending module specifically is configured to invoke a third function of the authentication plugin to send the device authentication data and the user logon information to the authentication plugin;

in Embodiment 5, the third function of the authentication plugin is specifically onUserTwofactorAuthenticate function.

the twenty-first receiving module is configured to receive the device authentication data and the user logon information from the website;

the twentieth sending module is configured to send the second authentication request which includes the device authentication data and the user identification of the user logon information to the authentication server;

the twenty-second receiving module is configured to second authentication request from the authentication plugin;

the second verifying module is configured to obtain the first public key corresponding to the user identification in the second authentication request, use the first public key to verify the second signing value to obtain the second authentication result;

the twenty-first sending module is configured to send the second authentication result to the authentication plugin;

the twenty-third receiving module is configured to receive the second authentication result from the server;

the twenty-second sending module is configured to send the second authentication result to the website;

the twenty-fourth receiving module is configured to receive the second authentication result from the authentication plugin;

the third determining module is configured to determine whether the user logs on successfully according to the second authentication result;

the twenty-third sending module is configured to send information of successful logon to the browser after the third determining module determines that the user logs on successfully; to send information of failed logon to the browser after the third determining module determines that the user logs on unsuccessfully;

the twenty-fourth receiving module is configured to receive information of successful logo or information of failed logon from the website;

the fifth displaying module is configured to display that user logs on successfully after the twenty-fourth receiving module receives the information of successful logon; display that the user logs on unsuccessfully after the twenty-fourth receiving module receive s the information of failed logon.

In Embodiment 5, the authentication device further includes: a sixth displaying module; correspondingly, the fourth displaying module is configured to display the page of waiting for authenticating; the sixth displaying module is configured to, after the eighteenth receiving module receives the device authentication request and before the fourth obtaining module obtains the information that the user has pressed the button, prompt the user to press the button of the authentication device.

In Embodiment 5, the browser includes a browser script, correspondingly, the second obtaining module is specifically configured to, after the browser script of the browser monitors an logon clicking event, obtain the user logon information in the browser page via the browser script;

the twelfth sending module is specifically configured to generate the obtaining device authentication request including the user identification of the user logon information via the browser script, send the obtaining device authentication request including the user identification of the user logon information to the authentication plugin;

the eighteenth sending module specifically is configured to send the device authentication data and the user logon information to the website via the browser script.

the browser further includes a first assigning module;

the first assigning module is configured to, after the seventh sending module sends the device authentication data to the browser, assign the device authentication data to the hidden form item;

the eighteenth sending module specifically is configured to send a hidden form item and the user logon information to the website via the browser script.

In Embodiment 5, the registration plugin further includes a first initializing module;

the first initializing module is configured to, before the third sending module 06 sends the device registration request to the authentication server, initialize the session channel with the authentication server.

the first initializing module specifically is configured to, before the third sending module 06 sends the device registration request to the authentication server, to initialize the session channel with the authentication server according to preset configuration information.

In Embodiment 5, the authentication plugin further includes: a second initializing module;

the second initializing module is configured to, before the thirteenth sending module send the obtaining device authentication request to the authentication server, initialize the session channel with the authentication server.

the second initializing module is specifically configured to, before the thirteenth sending module send the obtaining device authentication request to the authentication server, initialize the session channel with the authentication server according the preset configuration information.

The integrating system for the authentication device and the website provided in Embodiment 5, which integrates the authentication device and the website, realizes that a user registers on a website and is authenticated by the website.

Embodiment 6

Figure 8:
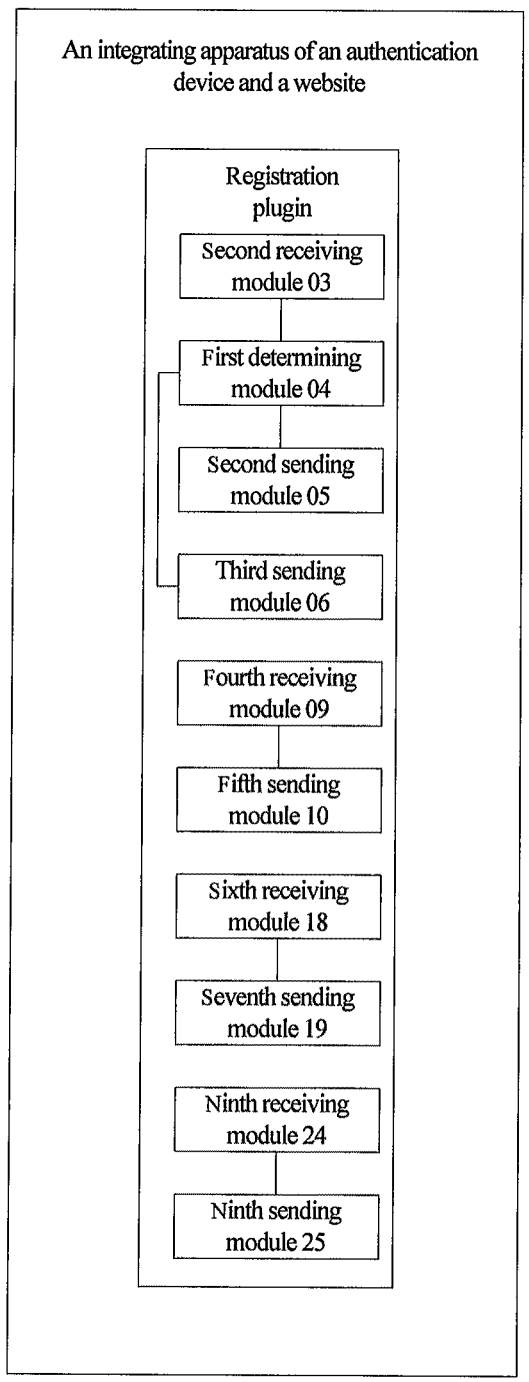
FIG. 8 is a block diagram of a system for integrating an authentication device and a website provided in Embodiment 6.

The Embodiment 6 provides an apparatus for integrating an authentication device and a website. As shown in FIG. 8, the integrating apparatus includes registration plugin;

In Embodiment 6, the website specifically is developed by using Joomla technology.

The registration plugin includes: a second receiving module 03, a first determining module 04, a second sending module 05, a third sending module 06, a fourth receiving module 09, a fifth sending module 10, a sixth receiving module 18, a seventh sending module 19, a ninth receiving module 24 and a ninth sending module 25;

the second receiving module 03 is configured to receive the user logon information and a registration result identification corresponding to the user registration information from the website.

the second receiving module 03 specifically is configured to, when the first function of the registration plugin is invoked, receive the user logon information and the registration result identification corresponding to the user registration information from the website.

In Embodiment 6, the first function of the registration plugin is specifically onUserAfterSave function.

the first determining module 04 is configured to determine whether the user has registered successfully according to the registration result identification;

the second sending module 05 is configured to, after the first determining module 04 determines that the user has registered successfully, send information that the user has registered already to the website;

the third sending module 06 is configured to, after the first determining module 04 determines that the user has registered unsuccessfully, send an obtaining device registration request including a user identification of the user logon registration information to the authentication server;

the fourth receiving module 09 is specifically configured to receive the device registration request from the server;

the fourth receiving module 09 is specifically configured to receive a device registration request including a first challenge value and application parameters from the authentication server.

the fifth sending module 10 is configured to send a device registration request to an authentication device via the browser;

the sixth receiving module 18 is configured to receive the device registration data generated by the authentication device from the browser;

the sixth receiving module 18 is specifically configured to receive the device registration data, which includes a key handle, a first public key, a first signing value and a hardware certificate, from the browser.

the seventh sending module 19 is configured to send a first authentication request including the device registration data to the authentication server;

the ninth receiving module 24 is configured to receive a first authentication result from the authentication server;

the ninth sending module 25 is configured to send the first authentication result to the website.

In Embodiment 6, the apparatus further includes a browser. The browser includes a twelfth receiving module, a first displaying module and an eleventh sending module;

the twelfth receiving module is configured to receive a device registration request from the registration plugin;

the first displaying module is configured to prompts the user to press a button of the authentication device on the page of waiting for registering after the twelfth receiving module receives the device registration request or displaying the page of waiting for registering after the twelfth receiving module 12 receives the device registration request;

the eleventh sending module is configured to send the device registration request to the authentication device.

Further, the fifth sending module 10 specifically includes a first generating unit and a first sending unit, or specifically includes a second generating unit and a second sending unit;

the first generating unit is configured to generate a first URL redirection request including the device registration request;

the first sending unit is configured to send the first URL redirection request including the device registration request to the browser;

the twelfth receiving module is specifically configured to receive the first URL redirection request including the device registration request from the browser;

the first displaying module is specifically configured to displaying the page of waiting for registering to the user according to the first URL redirection request and press the button of the authentication device on the page of waiting for registering;

the eleventh sending module is specifically configured to send the device registration request in the first URL redirection request to the authentication device.

the second generating unit is configured to generate a second URL redirection request including the device registration request;

the second sending unit is configured to send the second URL redirection request including the device registration request to the browser;

the twelfth receiving module is specifically configured to receive the second URL redirection request including the device registration request from the browser;

the first displaying module is specifically configured to display the page of waiting for registration according to the second URL redirection request;

the eleventh sending module specifically is configured to send the device registration request in the second URL redirection request to the authentication device.

The apparatus provided in Embodiment 6 further includes an authentication device; if the first displaying module is configured to display the page of waiting for registering after the twelfth module receives the device registration request, the authentication device further includes a third displaying module, a fifth displaying module, a first obtaining module, a first generating module and a sixth sending module;

the fifth receiving module is configured to receive the device registration request from the browser;

the first obtaining module is configured to, after the fifth receiving module receives the device registration request, wait for the user to press the button and obtain information that the user has pressed the button;

the first generating module is configured to, after the first obtaining module obtains the information that the user has pressed the button, generate a key handle according to the first challenge value and the application parameters which are in the device registration request, the first public key and the first private key which are corresponds to the key handle, use a preset hardware private key to sign the first public key and the key handle to generate a first signing value; organize device registration data including the key handle, the first public key, the first signing value the hardware certificate;

the sixth sending module is configured to send the device registration data, which includes key handle, the first public key, the first signing value, the hardware certification generated by the first generating module, to the registration plugin via the browser;

the third displaying module is configured to, after the fifth receiving module receives the device registration request and before the first obtaining module obtains the information that the user has pressed the button, prompt the user to press the butting of the authentication device.

If the first displaying module is configured to prompt the user to press the button of the authentication device on the page of waiting for registering after the twelfth receiving module receives the device registration request, the authentication device includes a fifth receiving module, the first obtaining module, the first generating module and the sixth sending module;

the fifth sending module is configured to receive the device registration request from the browser;

the first obtaining module is configured to, after the fifth receiving module receives the device registration request, wait for the user to press the button and obtain the information that the user has pressed the button;

the first generating module is configured to, after the first obtaining module obtains the information that the user has pressed the button, generate the key handle according to the first challenge value and the application parameters, which are in the device registration request, the first public key and the first private key corresponding to the key handle, use the preset hardware private key to sign the first public key and the key handle to generate a first signing value, organize the device registration data including the key handle, the first public key, the first signing value and the hardware certificate;

the sixth sending module is configured to send the device registration data which includes the key handle, the first public key, the first signing value and the hardware certificate generated by the first generating module to the registration plugin via the browser.

Further, the apparatus provided in Embodiment 6 further includes an authentication server; the authentication server includes a third receiving module, a fourth sending module, a seventh receiving module, a first verifying module, a first associating mode and the eighth sending module;

the third receiving module is configured to receive the obtaining registration request including the user identification in the user registration information from the registration plugin;

the fourth sending module is configured to send the device registration request including the first challenge value and the application parameters to the registration plugin;

the seventh receiving module is configured to receive the first authentication request including the device registration data from the registration plugin;

the first verifying module is configured to obtain the hardware public key from the hardware certificate of the first authentication request from the seventh receiving module, use the hardware public key to verify the first signing value to obtain the first authentication result;

the first associating module is configured to build corresponding relation among the key handle, the first public key and the user identification if the first authentication result is success;

the eighth sending module is configured to send the first authentication result to the registration plugin after the first associating module builds corresponding relation among the key handle, the first public key and the user identification; send the first authentication result to the registration plugin if the first authentication result is failure.

Further, the apparatus provided in Embodiment 6 further includes the website and the browser;

the website includes a tenth receiving module, a second determining module and tenth sending module 29; the browser includes a thirteenth receiving module and a second displaying module;

the tenth receiving module is configured to receive the first authentication result from the registration plugin;

the second determining module is configured to determine whether the user is registered successfully according to the first authentication result received by the tenth receiving module;

the tenth sending module 29 is configured to send information of successful registration to the browser after the second determining module determines that the user is registered successfully; send information of failed registration to the browser after the second determining module determines that the user is registered unsuccessfully;

the thirteenth receiving module is configured to receive information of successful registration or information of unsuccessful registration from the website;

the second displaying module is configured to display that the user has registered successfully after the thirteenth receiving module receives information of successful registration; display that the user has registered unsuccessfully after the thirteenth receiving module receives information of unsuccessful registration;

in Embodiment 6, the tenth sending module is further configured to, after the eleventh receiving module receives information that the user has registered, send information that the user has registered to the browser; correspondingly, the thirteenth module further is configured to receive the information that the user has been registered from the website; the second displaying module is further configured to display that the user has registered after the thirteenth receiving module receives information that the user has registered.

Further, the website further includes a first setting module;

the first determining module 04 specifically is configured to determine whether the registration result identification corresponding to the user registration information is successful identification; if yes, it determines that the user has registered successfully; otherwise, it determines that the user has registered unsuccessfully;

the first setting module is configured to, after the second determining module determines that the user has registered successfully, set the registration result identification corresponding to the user registration information as successful identification.

The apparatus provided in Embodiment 6 further includes an authentication plugin;

the authentication plugin includes a fourteenth receiving module, a thirteenth sending module, a sixteenth receiving module, a fifteenth sending module, a twenty-first receiving module, a twentieth sending module, a twenty-third receiving module and a twenty-second sending module;

the fourteenth receiving module is configured to receive an obtaining device authentication request from the browser;

the fourteenth receiving module is specifically configured to, when the second function of the authentication plugin is invoked, receive the obtaining device authentication request including the user identification of the user logon information from the browser.

In Embodiment 6, the second function of the authentication plugin is specifically onAfterRender function.

The thirteenth sending module is configured to send the obtaining device authentication request to the authentication server;

the sixteenth receiving module is configured to receive the device authentication request from the server;

the fifteenth sending module is configured to send the device authentication request to the browser;

The twenty-first receiving module is configured to receive the device authentication data and the user logon information from the website;

the twenty-first receiving module specifically is configured to, when a third function of the authentication plugin is invoked, receive the device authentication data and the user logon information from the website.

In Embodiment 6, the third function of the authentication plugin is specifically onUserTwofactorAuthenticate function.

The twentieth sending module is configured to send a second authentication request including the device authentication data and the user identification of the user logon information to the authentication server;

the twenty-third receiving module is configured to receive a second authentication result from the authentication server;

the twenty-second module is configured to send the second authentication result to the website.

When the apparatus provided in Embodiment 6 further includes the authentication plugin, the apparatus further includes a browser, the browser includes a seventeenth receiving module, a fourth displaying module and a sixteenth sending module;

the seventeenth receiving module is configured to receive the device authentication request from the authentication plugin;

the fourth displaying module is configured to, when the seventeenth receiving module receives the device authentication request from the authentication plugin, prompt the user to press the button of the authentication device on the page of waiting for authentication or display the page of waiting for authentication;

the sixteenth sending module is configured to send the device authentication request to the authentication device.

In the case that the apparatus provided in Embodiment 6 further includes the authentication plugin, the apparatus further includes an authentication device and a browser;

the authentication device includes an eighteenth receiving module and a seventeenth sending module;

the browser includes a nineteenth receiving module and an eighteenth sending module;

the eighteenth receiving module is configured to receive the device authentication request from the browser;

the seventeenth sending module is configured to send the device authentication data to the browser;

the nineteenth receiving module is configured to receive the device authentication data from the authentication device;

the eighteenth sending module is configured to send the device authentication data and the user logon information to the website.

In the case that the browser includes the nineteenth receiving module and eighteenth sending module, the browser further includes a second obtaining module and a twelfth sending module;

the second obtaining module is configured to obtain user logon information;

the twelfth sending module is configured to send the obtaining device authentication request including the user identification of the user logon information to the authentication plugin.

In Embodiment 6, the browser includes a browser script; correspondingly, the second obtaining module specifically is configured to, after the browser script of the browser monitors a logon clicking event, obtain the user logon information of the browser page via the browser script;

the twelfth sending module is specifically configured to generate the obtaining device authentication request including the user identification of the user logon information via the browser script, send the obtaining device authentication request of the user identification of the user logon to the authentication plugin;

the eighteenth sending module is specifically configured to send the device authentication data and the user logon information to the website via the browser script.

Further, the browser further includes a first assigning module;

the first assigning module is configured to, after the seventeenth sending module send the device authentication data to the browser, assign the device authentication data to the hidden form item on the browser page via the browser script;

the eighteenth sending module is specifically configured to send the hidden form item and the user logon information to the website via the browser script.

In the case that the apparatus provided in Embodiment 6 further includes the authentication plugin, the apparatus further includes an authentication device;

in the case that the fourth displaying module is configure to displaying the page of waiting for authentication after the seventeenth receiving module receives the device authentication request from the authentication plugin, the authentication device includes a sixth displaying module, a fourth obtaining module and a second generating module;

the fourth obtaining module is configured to wait for the user to press the button and obtain information that the user has press the button;

the second generating module is configured to obtain the first private key corresponding to the key handle in the device authentication request, use the first private key to sign the second challenge value and the application parameters, which are in the device authentication request, to generate a second signing value, generate the device authentication data including the second signing value.

the sixth displaying module is configured to prompt the user to press the button of the authentication device before the fourth obtaining module obtains the information that the user has pressed the button.

In the case that the fourth displaying module is configured to prompt the user to press the button of the authentication device on the page of waiting for authentication after the seventeenth receiving module receives the device authentication request of the authentication plugin, the authentication device includes a fourth obtaining module and a second generating module;

the fourth obtaining module is configured to wait for the user to press the button and obtain the information that the user has pressed the button;

the second generating module is configured to obtain the first private key corresponding to the key handle in the device authentication request, use the first private key to sign the second challenge value and the application parameters in the device authentication request to generate the second signing value, generate the device authentication data including the second signing value.

In the case that the apparatus provided in Embodiment 6 further includes the authentication plugin and the authentication device, the device further includes an authentication server;

the authentication server includes a third obtaining module, a fifteenth receiving module, a fourteenth sending module, a twenty-second receiving module, the second verifying module and the twenty-first sending module;

the fifteenth receiving module is configured to receive the obtaining device authentication request from the authentication plugin;

the third obtaining module is configured to obtain the key handle corresponding to the user identification of the obtaining authentication device request;

the fourteenth sending module is configured to send the device authentication request including the key handle, the second challenge value and the application parameters to the authentication plugin;

the twenty-second receiving module is configured to receive the second authentication request, which include the device authentication data and the user logon information, from the authentication plugin;

the second verifying module is configured to obtain the first public key corresponding to the user identification of the second authentication request, use the first public key to verify the second signing value to obtain the second authentication result;

the twenty-first sending module is configure to send the second authentication result to the authentication plugin.

In the case that the apparatus provided in Embodiment 6 further includes the authentication plugin, the apparatus further includes the website and the browser;

the website comprises the twenty-fourth receiving module, the third determining module, and the twenty-third sending module; and the browser comprises the twenty-fourth receiving module and the fifth displaying module;

the twenty-fourth receiving module is configured to receive the second authentication result from the authentication plugin;

the third determining module is configured to determine whether the user has successful logon according to the second authentication result;

the twenty-third sending module is configured to send information of successful logon after the third determining module determines that the user has successful logon; send information of failed logon after the third determining module determines that the user has unsuccessful logon;

the twenty-fourth receiving module is configured to receive information of successful logon and information of unsuccessful logon from the website;

the fifth displaying module is configured to display that the user has logged on successfully after the twenty-fourth receiving module receives successful logon information; display that the user has logged on unsuccessfully after the twenty-fourth receiving module receives unsuccessful logon information.

Embodiment 6 provides an apparatus for integrating the authentication device and the website, which integrates the authentication and the website, which realizes that the user registers on a website and is authenticated by the website.

Finally, it should be noted that the above embodiments are merely intended to explain, rather than to limit, various technical solutions of the present disclosure described above. Although the present disclosure has been explained in detail with reference to the foregoing embodiments, those skilled in the art should appreciate that modifications can still be made to the technical solutions recorded in the embodiments described hereinabove, or equivalent substitutions are still possible for part or all of the technical features therein, without causing the essence of the corresponding technical solution to deviate from the scope of various embodiment technical solutions of the present disclosure.

The invention claimed is:

1. A method for integrating an authentication device and a website, wherein said method comprises:
   a registering process, the registering process comprises:
   Step t1, receiving, by a registration plugin, user registration information and a registration result identification corresponding to the user registration information from the website;
   Step t2, determining, by the registration plugin, when any user is registered successfully according to the registration result identification, sending information that the user has been registered to the website and ending the registering process; otherwise, sending an obtaining device registering request, which comprises a user identification in the user registration information, to an authentication server, then executing Step t3;
   Step t3, receiving, by the registration plugin, a device registering request from the authentication server;
   Step t4, sending, by the registration plugin, the device registering request to an authentication device via a browser, waiting for the authentication device to generate device registration data;
   Step t5, receiving, by the registration plugin, the device registration data generated by the authentication device via the browser;
   Step t6, sending, by the registration plugin, a first authentication request including the device registration data to the authentication server;
   Step t7, receiving, by the registration plugin, a first authentication result from the authentication server; and
   Step t8, sending, by the registration plugin, the first authentication result to the website, in which the first authentication result is used for the website to authenticate whether the user has been registered successfully, and
   the method further comprises an authentication process, the authentication process comprises:

Step w1, receiving, by an authentication plugin, an obtaining device authentication request including the user identification in user logon information from the browser;

Step w2, sending, by the authentication plugin, the obtaining device authentication request to the authentication server;

Step w3, receiving, by the authentication plugin, a device authentication request from the authentication server;

Step w4, sending, by the authentication plugin, the device authentication request to the authentication device via the browser; and waiting for the authentication device to generate device authentication data;

Step w5, sending, by the authentication plugin, a second authentication request including the device authentication data and the user identification in the user logon information to the authentication server after the authentication plugin receives the device authentication data and the user logon information via the website;

Step w6, receiving, by the authentication plugin, a second authentication result from the authentication server; and Step w7, sending, by the authentication plugin, the second authentication result to the website, so that the website verifies whether the user logs on successfully.

2. The method of claim 1, wherein in Step t4, after sending, by the registration plugin, the device registering request to the authentication device via the browser, the method further comprises: promoting, by the registration plugin, the user to press a button of the authentication device at a page waiting for registering via the browser, or displaying, by the registration plugin, the page waiting for registering via the browser.

3. The method of claim 2, wherein if prompting, by the registration plugin, the user to press the button of the authentication device at the page waiting for registering via the browser, the Step t4 specifically comprises: generating, by the registration plugin, a first web address redirecting request including the device registering request, sending the first web address redirecting request including the device registering request to the browser, displaying the page waiting for registering to the user via the browser; prompting the user to press the button of the authentication device at the page waiting for registering; sending the device registering request in the first web address redirecting request to the authentication device via the browser, and waiting for the authentication device to generate device registering data.

4. The method of claim 2, wherein if displaying, by the registration plugin, the page waiting for registering via the browser, Step t4 specifically comprises: generating, by the registration plugin, a second web address redirecting request including the device registering request, sending the second web address redirecting request including the device registering request to the browser, displaying the page waiting for registering to the user via the browser, sending the device registering request in the second web address redirecting request to the authentication device via the browser, and waiting for the authentication device to generate device registration data.

5. The method of claim 2, wherein if displaying, by the registration plugin, the page waiting for registering via the browser, generating, by the authentication device, the device registration data specifically comprises: prompting, by the authentication device, the user to press the button of the authentication device, waiting for the user to press the button; generating a key handle, a first public key and a first private key, which are corresponding to the key handle, according to a first challenge value and application parameters in the device registering request after obtaining information that the user has pressed down the button; using a preset hardware private key to sign the first public key and the key handle to generate a first signing value; and organizing the device registration data including the key handle, the first public key, the first signing value and a hardware certificate.

6. The method of claim 2, wherein if prompting, by the registration plugin, the user to press the button of the authentication device at the page waiting for register via the browser, generating, by the authentication device, the device registration data specifically comprises: waiting for, by the authentication device, the user to press the button; generating a key handle, a first public key and a first private key, which are corresponding to the key handle, according to a first challenge value and application parameters in the device registering request after obtaining information that the user has pressed down the button; using a preset hardware private key to sign the first public key and the key handle to generate the first signing value; and organizing the device registration data including the key handle, the first public key, the first signing value and a hardware certificate.

7. The method of claim 5, wherein the method further comprises: sending, by the authentication server, the device registering request including the first challenge value and the application parameters to the registration plugin after the authentication server receives the obtaining device registering request comprising the user identification in the user registration information of the registration plugin; obtaining, by the authentication server, a hardware public key from the hardware certificate after the authentication server receives the first authentication request including the device registration data from the registration plugin; using the hardware public key to verify the first signing value to obtain a first authentication result, if the first authentication result is successful, establishing corresponding relationship among the key handle, the first public key and the user identification, sending the first authentication result to the registration plugin; if the first authentication result is failure, sending the first authentication result to the registration plugin.

8. The method of claim 6, wherein the method further comprises: sending, by the authentication server, the device registering request including the first challenge value and the application parameters after the authentication server receives the obtaining device registering request including the user identification in the user registration information from the registration plugin; obtaining, by the authentication server, a hardware public key from the hardware certificate after the authentication server receives the first authentication request including the device registration data from the registration plugin; using the hardware public key to verify the first signing value to obtain the first authentication result, if the first authentication result is successful, establishing corresponding relationship among the key handle, the first public key and the user identification, sending the first authentication result to the registration plugin; if the first authentication result is failure, sending the first authentication result to the registration plugin.

9. A system for integrating an authentication device and a website, wherein said system comprises an authentication device, a browser, a website, a registration plugin and an authentication server;

the website comprises a first receiving processing logic, a first sending processing logic, a tenth receiving processing logic, a second determining processing logic, a eleventh receiving processing logic and a tenth sending processing logic;

the registration plugin comprises a second receiving processing logic, a first determining processing logic, a second sending processing logic, a third sending processing logic, a fourth receiving processing logic, a fifth sending processing logic, a sixth receiving processing logic, a seventh sending processing logic, a ninth receiving processing logic, and a ninth sending processing logic;

the authentication server comprises a third receiving processing logic, a fourth sending processing logic, a seventh receiving processing logic, a first verifying processing logic, a first associating processing logic and a eighth sending processing logic;

the authentication device comprises a fifth receiving processing logic, a first obtaining processing logic, a first generating processing logic and a sixth sending processing logic;

the browser comprises a twelfth receiving processing logic, a eleventh sending processing logic, a first displaying processing logic, a thirteenth receiving processing logic and a second displaying processing logic;

the first receiving processing logic is configured to receive user registration information via the browser;

the first sending processing logic is configured to send the user registration information and a register identification corresponding to the user registration information to the registration plugin;

the second receiving processing logic is configured to receive the user registration information and a registration result identification corresponding to the user registration information from the website;

the first determining processing logic is configured to determine whether a user has registered successfully according to the registration result identification;

the second sending processing logic is configured to send information that the user has registered to the website when the determining result of the first determining processing logic is successfully registered yes;

the third sending processing logic is configured to send an obtaining device register request including a user identification in the user registration information to the authentication server when the determining result of the first determining processing logic is not successfully registered;

the third receiving processing logic is configured to receive the obtaining device register request including the user identification in the user registration information from the registration plugin;

the fourth sending processing logic is configured to send a device registering request including a first challenge value and an application parameter to the registration plugin;

the fourth receiving processing logic is configured to receive the device registering request including the first challenge value and the application parameter of authentication server from the authentication server;

the fifth sending processing logic is configured to send the device registering request to the browser;

the twelfth receiving processing logic is configured to receive the device registering request including the first challenge value and the application parameter of the authentication server from the registration plugin;

the first displaying processing logic is configured to prompt the user to press down a button of the authentication device via a register waiting page after the twelfth receiving processing logic receives the device registering request;

the eleventh sending processing logic is configured to send the device registering request to the authentication device;

the fifth receiving processing logic is configured to receive the device registering request from the browser;

the first obtaining processing logic is configured to wait for the user to press down the button and obtain information that the user has pressed down the button when the fifth receiving processing logic receives the device registering request;

the first generating processing logic is configured to generate a key handle, a first public key and a first private key, which are corresponding to the key handle, according to the first challenge value and the application parameters in the device registering request, use a preset hardware private key and said key handle to generate a first signing value, and organize device registration data including the key handle, the first public key, the first signing value and a hardware certificate after the first obtaining processing logic obtains the information that the user has pressed down the button;

the sixth sending processing logic is configured to send the device registration data, which comprises the key handle, the first public key, the first signing value and the hardware certificate, generated by the first generating processing logic to the registration plugin via the browser;

the sixth receiving processing logic is configured to receive the device registration data which comprises the key handle, the first public key, the first signing value and the hardware certificate from the browser;

the seventh sending processing logic is configured to send a first authentication request comprising the device registration data to the authentication server;

the seventh receiving processing logic is configured to receive the first authentication request including the device registration data from the registration plugin;

the first verifying processing logic is configured to obtain a hardware public key from the hardware certificate of the first authentication request received by the seventh receiving processing logic, and use the hardware public key to verify the first signing value to obtain a first authentication result;

the first associating processing logic is configured to build corresponding relationship among the key handle, the first public key and the user identification when the first authentication result is successful;

the eighth sending processing logic is configured to send the first authentication result to the registration plugin after the first associating processing logic builds the corresponding relationship among the key handle, the first public key and the user identification; and send the first authentication result to the registration plugin when the first authentication result is failure;

the ninth receiving processing logic is configured to receive the first authentication result from the authentication server;

the ninth sending processing logic is configured to send the first authentication result to the website;

the tenth receiving processing logic is configured to receive the first authentication result of the registration plugin;

the second determining processing logic is configured to determine whether the user has been registered successfully according to the first authentication result received by the tenth receiving processing logic;

the eleventh receiving processing logic is configured to receive registered information from the registration plugin;

the tenth sending processing logic is configured to send information of successfully registering to the browser when the determining result of the second determining is successfully registered send information of failed registering to the browser when the determining result of the second determining processing logic is not successfully registered and send the registered information to the browser after the eleventh receiving processing logic receives the registered information from the registration plugin;

the thirteenth receiving processing logic is configured to receive the information of successfully registering, the information of failed registering or the registered information; and the second displaying processing logic is configured to display that the user has been registered successfully after the thirteenth receiving processing logic receives the information of successfully registering; display that the user failed to be registered after the thirteenth receiving processing logic receives the information of failed registering; and display that the user has been registered after the thirteenth receiving processing logic receives the information that the user has been registered.

10. An apparatus for integrating an authentication device and a website, wherein said apparatus comprises:
a registration plugin;

the registration plugin comprises: a second receiving processing logic, a first determining processing logic, a second sending processing logic, a third sending processing logic, a fourth receiving processing logic, a fifth sending processing logic, a sixth receiving processing logic, a seventh sending processing logic, a ninth receiving processing logic and a ninth sending processing logic;

the second receiving processing logic is configured to receive user registration information and a registration result identification corresponding to the user registration information from the website;

the first determining processing logic is configured to determine when a user has been registered successfully according to the registration result identification;

the second sending processing logic is configured to send information that the user has been registered to the website when the determining result of the first determining is registered successfully;

the third sending processing logic is configured to send an obtaining device registering request, which comprises a user identification in the user registration information, to an authentication server when the determining result of the first determining processing logic is not registered successfully;

the fourth receiving processing logic is configured to receive a device registering request from the authentication server;

the fifth sending processing logic is configured to send the device registering request to an authentication device via a browser;

the sixth receiving processing logic is configured to receive a device registration data generated by the authentication device from the browser;

the seventh sending processing logic is configured to send a first authentication request comprising the device registration data to the authentication server;

the ninth receiving processing logic is configured to receive a first authentication result from the authentication server; and the ninth sending processing logic is configured to send the first authentication result to the website to authenticate whether the user has been registered successfully according to the first authentication result, and the authentication device further comprises the browser; the browser comprises a twelfth receiving processing logic, a first displaying and a eleventh sending processing logic;

the twelfth receiving processing logic is configured to receive the device registering request from the registration plugin;

the first displaying processing logic is configured to prompt the user to press down a button of the authentication device at a page waiting for registering via the browser after the twelfth receiving processing logic receives the device registering request, and display the page waiting for registering via the browser after the twelfth receiving processing logic receives the device registering request; and the eleventh sending processing logic is configured to send the device registering request to the authentication device.

11. The apparatus of claim 10, wherein the fifth sending processing logic comprises a unit for first generating and a unit for first sending;

the unit for first generating is configured to generate a first web address redirecting request comprising the device registering request;

the unit for first sending s configured to send the first web address redirecting request comprising the device registering request to the browser;

the twelfth receiving processing logic is specifically configured to receive the first web address redirecting request comprising the device registering request from the browser;

the first displaying processing logic is specifically configured to display the page waiting for registering to the user according to the first web address redirecting request and prompt the user to press down the button of the authentication device via the page waiting for registering; and the eleventh processing logic sending is specifically configured to send the device registering request in the first web address redirecting request to the authentication device.

12. The apparatus of claim 10, wherein the fifth sending processing logic comprises a unit for second generating and a unit for second sending;

the unit for second generating is configured to generate a second web address redirecting request comprising the device registering request;

the unit for second sending is configured to send the second web address redirecting request comprising the device registering request to the browser;

the twelfth receiving processing logic is specifically configured to receive the second web address redirecting request comprising the device registering request from the browser;

the first displaying processing logic is specifically configured to display the page waiting for registering to the user according to the second web address redirecting request; and the eleventh sending processing logic is specifically configured to send the device registering request in the second web address redirecting request to the authentication device.

13. The apparatus of claim 10, wherein said apparatus further comprises the authentication device;

in the case that the first displaying processing logic is configured to receive the device registering request received by the second receiving processing logic and display the page waiting for registering, the authentication device comprises a third displaying processing logic, a fifth receiving processing logic, a first obtaining processing logic, a first generating processing logic and a sixth sending processing logic;

the fifth receiving processing logic is configured to receive the device registering request from the browser;

the first obtaining processing logic is configured to wait for the user to press down a button and obtain information that the user has pressed down the button after the fifth receiving processing logic receives the device registering request;

the first generating processing logic is configured to generate a key handle, a first public key and a first private key, which are corresponding to the key handle, according to a first challenge value and application parameters in the device registering request, use a preset hardware private key to sign the first public key and the key handle to generate a first signing value, organize the device registration data comprising the key handle, the first public key, the first signing value and a hardware certificate after the first obtaining processing logic obtains the information that the user has pressed down the button;

the sixth sending processing logic is configured to send the device registration data, which comprises the key handle, the first public key, the first signing value and the hardware certificate, generated by the first generating processing logic to the registration plugin via the browser; and the third displaying processing logic is configured to prompt the user to press down the button of the authentication device after the fifth receiving processing logic receives the device registering request and before the first obtaining processing logic obtains the information that the user has pressed down the button.

14. The apparatus of claim 10, wherein the apparatus further comprises the authentication device;

in the case that the first displaying processing logic is configured to prompt the user to press down the button of the authentication device via the page waiting for registering after the twelfth receiving processing logic receives the device registering request, the authentication device comprises the fifth receiving processing logic, the first obtaining processing logic, the first generating processing logic and the sixth sending processing logic;

the fifth receiving processing logic is configured to receive the device registering request from the browser;

the first obtaining processing logic is configured to wait for the user to press down a button and obtain information that the user has pressed down the button after the fifth receiving processing logic receives the device registering request;

the first generating processing logic is configured to generate a key handle, a first public key and a first private key, which are corresponding to the key handle, according to a first challenge value and application parameters in the device registering request, use a preset hardware private key to sign the first public key and the key handle to generate the first signing value, organize the device registration data comprising the key handle, the first public key, the first signing value and a hardware certificate after the first obtaining processing logic obtains the information that the user has pressed down the button; and the sixth sending processing logic is configured to send the device registration data, which comprises the key handle, the first public key, the first signing value and the hardware certificate, generated by the first generating processing logic to the registration plugin via the browser.

15. The apparatus of claim 13, wherein the apparatus further comprises the authentication server; the authentication server comprises a third receiving processing logic, a fourth sending processing logic, a seventh receiving processing logic, a first verifying processing logic, a first associating processing logic and a eighth sending processing logic;

the third receiving processing logic is configured to receive an obtaining device registering request comprising a user identification of the user registration information from the registration plugin;

the fourth sending processing logic is configured to send the device registering request, which comprises the first challenge value and the application parameters, to the registration plugin;

the seventh receiving processing logic is configured to receive a first authentication request comprising the device registration data from the registration plugin;

the first verifying processing logic is configured to obtain the hardware public key from the hardware certificate of the first authentication request received by the seventh receiving processing logic, use the hardware public key to verify the first signing value to obtain the first authentication result;

the first associating processing logic is configured to build corresponding relationship among the key handle, the first public key and the user identification if the first authentication result is successful; and the eighth sending processing logic is configured to send the first authentication result to the registration plugin after the first associating processing logic builds the corresponding relationship among the key handle, the first public key and the user identification; send the first authentication result to the registration plugin in the case that the first authentication result is failure.

16. The apparatus of claim 14, wherein the apparatus further comprises the authentication server; the authentication server comprises a third receiving processing logic, a fourth sending processing logic, a seventh receiving processing logic, a first verifying processing logic, a first associating processing logic and a eighth sending processing logic;

the third receiving processing logic is configured to receive an obtaining device registering request comprising the user identification of the user registration information from the registration plugin;

the fourth sending processing logic is configured to send the device registering request, which comprises the first challenge value and the application parameters, to the registration plugin;

the seventh receiving processing logic is configured to receive the first authentication request comprising the device registration data from the registration plugin;

the first verifying processing logic is configured to obtain the hardware public key from the hardware certificate of the first authentication request received by the seventh receiving processing logic, use the hardware public key to verify the first signing value to obtain the first authentication result;

the first associating processing logic is configured to build corresponding relationship among the key handle, the first public key and the user identification in the case that the first authentication result is successful; and the eighth sending processing logic is configured to send the first authentication result to the registration plugin after the first associating processing logic builds corresponding relationship among the key handle, the first public key and the user identification; send the first authentication result to the registration plugin; send the first authentication result to the registration plugin in the case that the first authentication result is failure.

17. The apparatus of claim 10, wherein the apparatus further comprises a website and a browser; the website comprises a tenth receiving-processing logic, a second determining processing logic and a tenth sending-processing logic; the browser comprises a thirteenth receiving and the second displaying-processing logic;

the tenth receiving processing logic is configured to receive the first authentication result from the registration plugin;

the second determining processing logic is configured to determine whether the user has been registered successfully according to the first authentication result received by the tenth receiving-processing logic;

the tenth sending processing logic is configured to send information of successfully registering to the browser after the second determining processing logic determines result is yes; and send information of failed registering to the browser after the second determining processing logic determines result is no;

the thirteenth receiving processing logic is configured to receive information of successfully registering or information of failed registering from the website; and the second displaying processing logic is configured to display that the user has been registered successfully after the thirteenth receiving processing logic receives information of successfully registering; and display that the user is registered unsuccessfully after the thirteenth receiving processing logic receives information of failed registering.

18. The apparatus of claim 10, wherein the apparatus further comprises authentication plugin; the authentication plugin comprises a fourteenth receiving-processing logic, a thirteenth sending-processing logic, a sixteenth receiving-processing logic, a fifteenth sending-processing logic, a twenty-first receiving-processing logic, a twentieth sending processing logic, a twenty-third receiving-processing logic, a twenty-second sending-processing logic;

the fourteenth receiving processing logic is configured to receive the obtaining device authentication request comprising the user identification of the user logon information from the browser;

the thirteenth sending processing logic is configured to send the obtaining device authentication request to the authentication server;

the sixteenth receiving processing logic is configured to receive a device authenticating request from the authentication server;

the fifteenth sending processing logic is configured to send the device authenticating request to the browser;

the twenty-first receiving processing logic is configured to receive the device authenticating data and the user logon information from the website;

the twentieth sending processing logic is configured to send the device authenticating data and the second authenticating request comprising the user identification of the user logon information the twenty-third receiving processing logic is configured to receive a second authenticating result from the authentication server; and the twenty-second sending processing logic is configured to send the second authenticating result to the website.

* * * * *